US012596631B2

(12) United States Patent (10) Patent No.: US 12,596,631 B2
Mola (45) Date of Patent: Apr. 7, 2026

(54) DIFFING PRIOR EXECUTIONS OF AN EXECUTABLE PROGRAM

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 18/557,412

(22) PCT Filed: May 2, 2022

(86) PCT No.: PCT/US2022/072041
§ 371 (c)(1),
(2) Date: Oct. 26, 2023

(87) PCT Pub. No.: WO2022/236246
PCT Pub. Date: Nov. 10, 2022

(65) Prior Publication Data
US 2024/0220396 A1 Jul. 4, 2024

(30) Foreign Application Priority Data

May 6, 2021 (LU) .................................... LU500131

(51) Int. Cl.
*G06F 11/362* (2025.01)
(52) U.S. Cl.
CPC ................................ *G06F 11/3636* (2013.01)
(58) Field of Classification Search
CPC .................................................. G06F 11/3636
(Continued)

(56) References Cited

U.S. PATENT DOCUMENTS 6,289,474 B1 * 9/2001 Beckerle ............. G06F 11/1458
714/13
6,327,699 B1 * 12/2001 Larus .................. G06F 11/3612
714/E11.22

(Continued)

OTHER PUBLICATIONS

Kong et al, "Runtime Monitoring of Software Execution Trace: Method and Tools", IEEE, 1-17 (Year: 2020).*

(Continued)

*Primary Examiner* — Anil Khatri
(74) *Attorney, Agent, or Firm* — Workman Nydegger

(57) ABSTRACT

Diffing prior executions of an executable program. A computer system assigns a weighting to each entity type in a first ordered set of a first plurality of entities and a second ordered set of a second plurality of entities, including assigning different weightings to different entity types. The computer system calculates an edit distance between the first and second ordered sets based on calculating a minimal cost path through a diffing structure. Calculating the minimal cost path includes partitioning the diffing structure around intersecting entries that are identified based on (i) only permitting replacements between entities that have a common entity type, and (ii) utilizing the different weightings to identify single-entity replacements that have higher cost than adjoining multi-entity replacements. Calculating the minimal cost path also includes applying a differencing algorithm to these partitions, in order to identify corresponding segments of the minimal cost path.

19 Claims, 15 Drawing Sheets

(58) Field of Classification Search
USPC ................................................ 717/125–140
See application file for complete search history.

(56) References Cited

U.S. PATENT DOCUMENTS

| | | | | |
|---|---|---|---|---|
| 7,783,799 | B1 * | 8/2010 | Sivertsen | G06F 3/0227 |
| | | | | 710/305 |
| 8,046,743 | B1 * | 10/2011 | Righi | G06F 11/362 |
| | | | | 714/38.14 |
| 8,111,618 | B2 * | 2/2012 | Li | H04L 43/50 |
| | | | | 370/230.1 |
| 8,694,797 | B2 * | 4/2014 | Challener | G06F 21/56 |
| | | | | 717/174 |
| 9,720,803 | B2 * | 8/2017 | Margalit | G06F 11/3636 |
| 9,864,672 | B2 * | 1/2018 | Seto | G06F 21/12 |
| 10,649,749 | B1 * | 5/2020 | Brooker | G06F 11/3628 |
| 2005/0183074 | A1 | 8/2005 | Alexander et al. | |
| 2008/0244531 | A1 | 10/2008 | Schmelter et al. | |
| 2012/0278658 | A1 | 11/2012 | Han | |
| 2018/0060213 | A1 | 3/2018 | Mola | |
| 2021/0150788 | A1 * | 5/2021 | Bhattacharyya | G06T 9/00 |
| 2021/0216438 | A1 * | 7/2021 | Mola | G06F 11/3466 |

OTHER PUBLICATIONS

Relational Database Approach for Execution Trace Analysis, IEEE, 1-4 (Year: 2012).*
Zuo et al, "Execution Reconstruction: Harnessing Failure Reoccurrences for Failure Reproduction", ACM, pp. 1-16 (Year: 2021).*
Abate et al, "An Extended Account of Trace-relating Compiler Correctness and Secure Compilation", ACM, pp. 1-48 (Year: 2021).*
Feng et al, "Hierarchical Abstraction of Execution Traces for Program Comprehension", ACM, pp. 1-11 (Year: 2018).*
"Search Report and Written Opinion Issued in Luxembourg Patent Application No. LU500131", Mailed Date: Jan. 26, 2022, 10 Pages.
"International Search Report and Written Opinion Issued in PCT Application No. PCT/US22/072041", Mailed Date: Jul. 7, 2022, 15 Pages.
Taheri, et al., "DiffTrace: Efficient Whole-Program Trace Analysis and Diffing for Debugging", In Proceedings of IEEE International Conference on Cluster Computing (Cluster), Sep. 23, 2019, 12 Pages.

* cited by examiner

*100*

Debugging <u>109</u>

Trace Access <u>114</u>

Entity Identification <u>115</u>

Entity Weighting <u>116</u>

Edit Distance <u>117</u>

Diffing Structure Generation <u>118</u>

Path Identification <u>119</u>

Partitioning <u>120</u>

Differencing <u>121</u>

Output <u>122</u>

| | A | C | A | A | A | A | A | A | A | A | A | A | B | A | A | A | A | A | A | A | A | ‟‟ |
|---|---|---|---|---|---|---|---|---|---|---|---|---|---|---|---|---|---|---|---|---|---|---|
| ‟‟ | 34 | 33 | 23 | 22 | 21 | 20 | 19 | 18 | 17 | 16 | 15 | 14 | 13 | 8 | 7 | 6 | 5 | 4 | 3 | 2 | 1 | 0 |
| A | 33 | 32 | 22 | 21 | 20 | 19 | 18 | 17 | 16 | 15 | 14 | 13 | 12 | 7 | 6 | 5 | 4 | 3 | 2 | 1 | 0 | 1 |
| A | 32 | 31 | 21 | 20 | 19 | 18 | 17 | 16 | 15 | 14 | 13 | 12 | 11 | 6 | 5 | 4 | 3 | 2 | 1 | 0 | 1 | 2 |
| A | 31 | 30 | 20 | 19 | 18 | 17 | 16 | 15 | 14 | 13 | 12 | 11 | 10 | 5 | 4 | 3 | 2 | 1 | 0 | 1 | 2 | 3 |
| A | 30 | 29 | 19 | 18 | 17 | 16 | 15 | 14 | 13 | 12 | 11 | 10 | 9 | 4 | 3 | 2 | 1 | 0 | 1 | 2 | 3 | 4 |
| B | 25 | 24 | 14 | 13 | 12 | 11 | 10 | 9 | 8 | 7 | 6 | 5 | 4 | 9 | 8 | 7 | 6 | 5 | 6 | 7 | 8 | 9 |
| A | 24 | 23 | 13 | 12 | 11 | 10 | 9 | 8 | 7 | 6 | 5 | 4 | 5 | 8 | 7 | 6 | 5 | 6 | 7 | 8 | 9 | 10 |
| A | 23 | 22 | 12 | 11 | 10 | 9 | 8 | 7 | 6 | 5 | 4 | 5 | 6 | 7 | 6 | 5 | 6 | 7 | 8 | 9 | 10 | 11 |
| A | 22 | 21 | 11 | 10 | 9 | 8 | 7 | 6 | 5 | 4 | 5 | 6 | 7 | 6 | 5 | 6 | 7 | 8 | 9 | 10 | 11 | 12 |
| C | 12 | 11 | 21 | 20 | 19 | 18 | 17 | 16 | 15 | 14 | 15 | 16 | 17 | 16 | 15 | 16 | 17 | 18 | 19 | 20 | 21 | 22 |
| A | 11 | 12 | 20 | 19 | 18 | 17 | 16 | 15 | 14 | 15 | 16 | 17 | 18 | 15 | 16 | 17 | 18 | 19 | 20 | 21 | 22 | 23 |
| A | 12 | 13 | 19 | 18 | 17 | 16 | 15 | 14 | 15 | 16 | 17 | 18 | 19 | 16 | 17 | 18 | 19 | 20 | 21 | 22 | 23 | 24 |
| A | 13 | 14 | 18 | 17 | 16 | 15 | 14 | 15 | 16 | 17 | 18 | 19 | 20 | 17 | 18 | 19 | 20 | 21 | 22 | 23 | 24 | 25 |
| B | 18 | 19 | 23 | 22 | 21 | 20 | 19 | 20 | 21 | 20 | 19 | 18 | 17 | 22 | 23 | 24 | 25 | 26 | 27 | 28 | 29 | 30 |
| A | 19 | 20 | 22 | 21 | 20 | 19 | 20 | 21 | 20 | 19 | 18 | 17 | 18 | 23 | 24 | 25 | 26 | 27 | 28 | 29 | 30 | 31 |
| A | 20 | 21 | 21 | 20 | 19 | 20 | 21 | 20 | 19 | 18 | 17 | 18 | 19 | 24 | 25 | 26 | 27 | 28 | 29 | 30 | 31 | 32 |
| A | 21 | 22 | 20 | 19 | 20 | 21 | 20 | 19 | 18 | 17 | 18 | 19 | 20 | 25 | 26 | 27 | 28 | 29 | 30 | 31 | 32 | 33 |
| A | 22 | 23 | 19 | 20 | 21 | 20 | 19 | 18 | 17 | 18 | 19 | 20 | 21 | 26 | 27 | 28 | 29 | 30 | 31 | 32 | 33 | 34 |

| | " | A | A | A | A | B | A | A | A | C | A | A | A | B | A | A | A | A |
|---|---|---|---|---|---|---|---|---|---|---|---|---|---|---|---|---|---|---|
| A | | | | | | | | 23 | 22 | 12 | 11 | 12 | 13 | 18 | 19 | 20 | 21 | 22 |
| C | | 32 | 31 | 30 | 29 | 24 | 23 | 22 | 21 | 11 | 12 | 13 | 14 | 19 | 20 | 21 | 22 | 23 |
| A | 23 | 22 | 21 | 20 | 19 | 14 | 13 | 12 | 11 | 21 | 20 | 19 | 18 | 23 | 22 | 21 | 20 | 19 |
| A | 22 | 21 | 20 | 19 | 18 | 13 | 12 | 11 | 10 | 20 | 19 | 18 | 17 | 22 | 21 | 20 | 19 | 20 |
| A | 21 | 20 | 19 | 18 | 17 | 12 | 11 | 10 | 9 | 19 | 18 | 17 | 16 | 21 | 20 | 19 | 20 | 21 |
| A | 20 | 19 | 18 | 17 | 16 | 11 | 10 | 9 | 8 | 18 | 17 | 16 | 15 | 20 | 19 | 20 | 21 | 20 |
| A | 19 | 18 | 17 | 16 | 15 | 10 | 9 | 8 | 7 | 17 | 16 | 15 | 14 | 19 | 20 | 21 | 20 | 19 |
| A | 18 | 17 | 16 | 15 | 14 | 9 | 8 | 7 | 6 | 16 | 15 | 14 | 15 | 20 | 21 | 20 | 19 | 18 |
| A | 17 | 16 | 15 | 14 | 13 | 8 | 7 | 6 | 5 | 15 | 14 | 15 | 16 | 21 | 20 | 19 | 18 | 17 |
| A | 16 | 15 | 14 | 13 | 12 | 7 | 6 | 5 | 4 | 14 | 15 | 16 | 17 | 20 | 19 | 18 | 17 | 18 |
| A | 15 | 14 | 13 | 12 | 11 | 6 | 5 | 4 | 5 | 15 | 16 | 17 | 18 | 19 | 18 | 17 | 18 | 19 |
| A | 14 | 13 | 12 | 11 | 10 | 5 | 4 | 5 | 6 | 16 | 17 | 18 | 19 | 18 | 17 | 18 | 19 | 20 |
| B | 13 | 12 | 11 | 10 | 9 | 4 | 5 | 6 | 7 | 17 | 18 | 19 | 20 | 17 | 18 | 19 | 20 | 21 |
| A | 8 | 7 | 6 | 5 | 4 | 9 | 8 | 7 | 6 | 16 | 15 | 16 | 17 | 22 | 23 | | | |
| A | 7 | 6 | 5 | 4 | 3 | 8 | 7 | 6 | 5 | 15 | 16 | 17 | 18 | 23 | | | | |
| A | 6 | 5 | 4 | 3 | 2 | 7 | 6 | 5 | 6 | 16 | 17 | 18 | 19 | 24 | | | | |
| A | 5 | 4 | 3 | 2 | 1 | 6 | 5 | 6 | 7 | 17 | 18 | 19 | 20 | 25 | | | | |
| A | 4 | 3 | 2 | 1 | 0 | 5 | 6 | 7 | 8 | 18 | 19 | 20 | 21 | 26 | | | | |
| A | 3 | 2 | 1 | 0 | 1 | 6 | 7 | 8 | 9 | 19 | 20 | 21 | 22 | 27 | | | | |
| A | 2 | 1 | 0 | 1 | 2 | 7 | 8 | 9 | 10 | 20 | 21 | 22 | 23 | | | | | |
| A | 1 | 0 | 1 | 2 | 3 | 8 | 9 | 10 | 11 | 21 | 22 | 23 | | | | | | |
| " | 0 | 1 | 2 | 3 | 4 | 9 | 10 | 11 | 12 | 22 | 23 | | | | | | | |

Figure 7C:
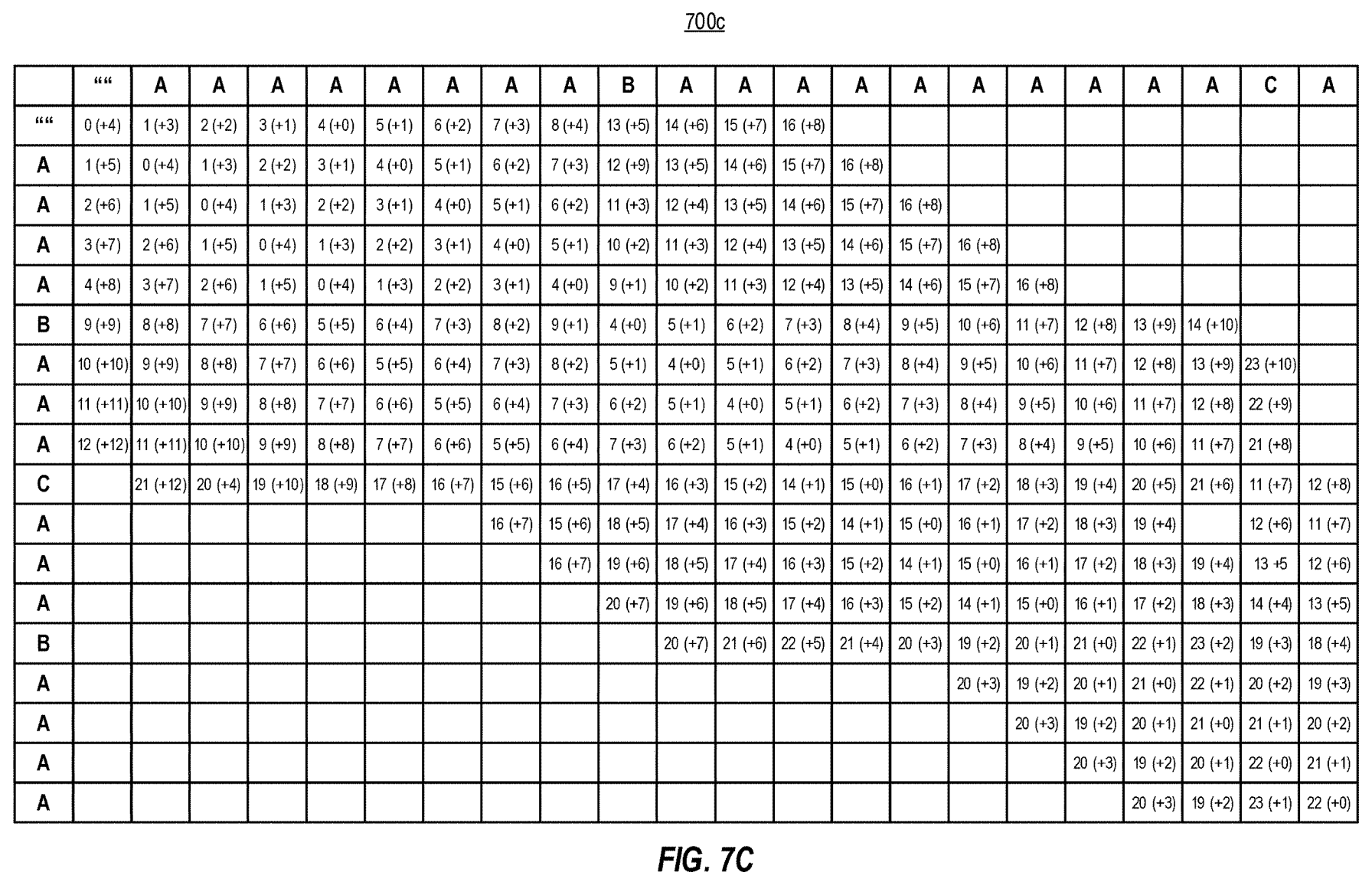

The figure is a large rotated matrix (an alignment/scoring grid). Each column is headed by a single letter; cell values have the form "N (±k)". Reading each column top‑to‑bottom:

| Column header | Values (top → bottom) |
|---|---|
| ««« | 0 (+4), 1 (+5), 2 (+6), 3 (+7), 4 (+8), 9 (+9), 10 (+10), 11 (+11), 12 (+12), 21 (+12) |
| A | 1 (+3), 0 (+4), 1 (+5), 2 (+6), 3 (+7), 8 (+8), 9 (+9), 10 (+10), 11 (+11), 21 (+12) |
| A | 2 (+2), 1 (+3), 0 (+4), 1 (+5), 2 (+6), 7 (+7), 8 (+8), 9 (+9), 10 (+10), 20 (+4) |
| A | 3 (+1), 2 (+2), 1 (+3), 0 (+4), 1 (+5), 6 (+6), 7 (+7), 8 (+8), 9 (+9), 19 (+10) |
| A | 4 (+0), 3 (+1), 2 (+2), 1 (+3), 0 (+4), 5 (+5), 6 (+6), 7 (+7), 8 (+8), 18 (+9) |
| A | 5 (+1), 4 (+0), 3 (+1), 2 (+2), 1 (+3), 6 (+4), 5 (+5), 6 (+6), 7 (+7), 17 (+8) |
| A | 6 (+2), 5 (+1), 4 (+0), 3 (+1), 2 (+2), 7 (+3), 6 (+4), 5 (+5), 6 (+6), 16 (+7) |
| A | 7 (+3), 6 (+2), 5 (+1), 4 (+0), 3 (+1), 8 (+2), 7 (+3), 6 (+4), 5 (+5), 15 (+6), 16 (+7) |
| A | 8 (+4), 7 (+3), 6 (+2), 5 (+1), 4 (+0), 9 (+1), 8 (+2), 7 (+3), 6 (+4), 16 (+5), 15 (+6), 16 (+7) |
| B | 13 (+5), 12 (+9), 11 (+3), 10 (+2), 9 (+1), 4 (+0), 5 (+1), 6 (+2), 7 (+3), 17 (+4), 18 (+5), 19 (+6), 20 (+7) |
| A | 14 (+6), 13 (+5), 12 (+4), 11 (+3), 10 (+2), 5 (+1), 4 (+0), 5 (+1), 6 (+2), 16 (+3), 17 (+4), 18 (+5), 19 (+6), 20 (+7) |
| A | 15 (+7), 14 (+6), 13 (+5), 12 (+4), 11 (+3), 6 (+2), 5 (+1), 4 (+0), 5 (+1), 15 (+2), 16 (+3), 17 (+4), 18 (+5), 21 (+6) |
| A | 16 (+8), 15 (+7), 14 (+6), 13 (+5), 12 (+4), 7 (+3), 6 (+2), 5 (+1), 4 (+0), 14 (+1), 15 (+2), 16 (+3), 17 (+4), 22 (+5) |
| A | 16 (+8), 15 (+7), 14 (+6), 13 (+5), 8 (+4), 7 (+3), 6 (+2), 5 (+1), 15 (+0), 14 (+1), 15 (+2), 20 (+3) |
| A | 16 (+8), 15 (+7), 14 (+6), 9 (+5), 8 (+4), 7 (+3), 6 (+2), 16 (+1), 15 (+0), 14 (+1), 19 (+2), 20 (+3) |
| A | 16 (+8), 15 (+7), 10 (+6), 9 (+5), 8 (+4), 7 (+3), 16 (+1), 15 (+0), 14 (+1), 15 (+2), 20 (+3) |
| A | 16 (+8), 11 (+7), 10 (+6), 9 (+5), 8 (+4), 17 (+2), 16 (+1), 15 (+0), 20 (+1), 19 (+2), 20 (+3) |
| A | 12 (+8), 11 (+7), 10 (+6), 9 (+5), 18 (+3), 17 (+2), 16 (+1), 21 (+0), 20 (+1), 19 (+2), 20 (+3) |
| A | 13 (+9), 12 (+8), 11 (+7), 10 (+6), 18 (+3), 17 (+2), 21 (+1), 20 (+0), 19 (+1), 20 (+2), 19 (+3) |
| A | 14 (+10), 13 (+9), 12 (+8), 11 (+7), 21 (+6), 19 (+4), 18 (+3), 23 (+2), 22 (+1), 21 (+0), 20 (+1), 19 (+2), 20 (+3) |
| C | 23 (+10), 22 (+9), 21 (+8), 11 (+7), 12 (+6), 13 +5, 14 (+4), 19 (+3), 20 (+2), 21 (+1), 22 (+0), 23 (+1) |
| A | 12 (+8), 11 (+7), 12 (+6), 13 (+5), 18 (+4), 19 (+3), 20 (+2), 21 (+1), 20 (+0), 21 (+1), 22 (+2) |

Bottom row of header letters (left → right): «««, A, A, A, A, B, A, A, A, C, A, A, A, B, A, A, A, A

| "'" | A | A | A | A | B | A | A | A | C | A | A | A | B | A | A | A | A |
|---|---|---|---|---|---|---|---|---|---|---|---|---|---|---|---|---|---|
| 0 -B+5A | 1 -B+4A | 2 -B+3A | 3 -B+2A | 4 -B+A | 5 -B | 6 -B-A | 7 -B-2A | 8 -B-3A | 13 -2B-3A | | | | | | | |
| 1 -B+6A | 0 -B+5A | 1 -B+4A | 2 -B+3A | 3 -B+2A | 4 -B+A | 5 -B | 6 -B-A | 7 -B-2A | 12 -2B-2A | | | | | | | |
| 2 -B+7A | 1 -B+6A | 0 -B+5A | 1 -B+4A | 2 -B+3A | 3 -B+2A | 4 -B-A | 5 -B | 6 -B-A | 11 -2B-A | 11 -2B-A | | | | | | |
| 3 -B+8A | 2 -B+7A | 1 -B+6A | 0 -B+5A | 1 -B+4A | 2 -B+3A | 3 -B-2A | 4 -B-A | 5 -B | 10 -2B | 10 -2B | 11 -2B-A | | | | | |
| 4 -B+9A | 3 -B+8A | 2 -B+7A | 1 -B+6A | 0 -B+5A | 1 -B+4A | 2 -B+3A | 3 -B-2A | 4 -B-A | 9 -2B+A | 9 -2B | 10 -2B | 11 | | | | |
| 9 +9A | 8 +8A | 7 +7A | 6 +6A | 5 +5A | 6 | 7 -B+3A | 8 -B-2A | 9 | 4 -B-A | 5 -B | 5 -B | 4 -B-A | 8 -B-3A | 9 -B-4A | 10 -B-5A | 11 -B-6A |
| 10 +9A | 9 +8A | 8 +7A | 7 +6A | 6 +5A | 5 +4A | 6 +3A | 7 +2A | 8 | 9 +A | 4 -B-A | 4 -B-A | 5 -B | 7 -B-2A | 8 -B-3A | 9 -B-4A | 10 -B-5A |
| 11 +10A | 10 +9A | 9 +8A | 8 +7A | 7 +6A | 6 +5A | 5 +4A | 6 +3A | 7 | 8 +2A | 5 -B | 9 +A | 4 -B-A | 6 -B-A | 7 -B-2A | 8 -B-3A | 9 -B-4A |
| | 11 +10A | 10 +9A | 9 +8A | 8 +7A | 7 +6A | 6 +5A | 5 +4A | 6 | 7 +3A | 4 -B-A | 8 +2A | 9 +A | 5 -B | 6 -B-A | 7 -B-2A | 8 -B-3A |
| | 20 +10A+C | 19 +9A+C | 18 +8A+C | 17 +7A+C | 16 +6A+C | 15 +5A+C | 16 +4A+C | 17 +4A+C | 16 +3A+C | 9 +A | 7 +3A | 8 +2A | 9 +A | 5 -B | 6 -B-A | 7 -B-2A |
| | | | | | | | | | | 8 +2A | 6 +A | 7 +3A | 8 +2A | 9 +A | 5 -B | 6 -B-A |
| | | | | | | | | | | 16 -B+2A+C | 15 -B+A+C | 16 -B+2A+C | 17 -B+4A+C | 18 -B+3A+C | 19 -B+4A+C | 20 -B+5A+C |
| | | | | | | | | | | | | | | | | 11 -B-6A |
| | | | | | | | | | | | | | | | | 21 -B-6A+C |

| | ‘‘‘‘ | A | A | A | A | B | A | A | A | B | A | A | A | A | C | A | A | A |
|---|---|---|---|---|---|---|---|---|---|---|---|---|---|---|---|---|---|---|
| A | | | | | | | | | | | | | | | | | | 22 |
| A | | | | | | | | | | | | | | | | | | 21 |
| A | | | | | | | | | | | | | | | | | | 20 |
| A | | | | | | | | | | | | | | | | | | 19 |
| A | | | | | | | | | | | | | | | | | | 18 |
| A | | | | | | | | | | | | | | | | | | 17 |
| A | | | | | | | | | | | | | | | | | | 16 |
| A | | | | | | | | | | | | | | | | | 16 | 15 |
| A | | | | | | | | | | | | | | | | 16 | 15 | 16 |
| A | | | | | | | | | | | | | | | 16 | 15 | 16 | |
| C | | | | | | | 9 | 10 | 11 | 16 | 17 | 18 | 19 | 20 | 15 | 16 | | |
| A | | | | | | 5 | 4 | 5 | 6 | 11 | 12 | 13 | 14 | 15 | 25 | | | |
| B | | | | | | 9 | 4 | 5 | | | | | | | | | | |
| A | | | | | 4 | 9 | | | | | | | | | | | | |
| A | | | | | 3 | 8 | | | | | | | | | | | | |
| A | | | | | 2 | 7 | | | | | | | | | | | | |
| A | | | | | 1 | 6 | | | | | | | | | | | | |
| A | | | | 1 | 0 | 5 | | | | | | | | | | | | |
| A | | | 1 | 0 | 1 | | | | | | | | | | | | | |
| A | | 1 | 0 | 1 | | | | | | | | | | | | | | |
| A | 1 | 0 | 1 | | | | | | | | | | | | | | | |
| ‘‘‘‘ | 0 | 1 | | | | | | | | | | | | | | | | |

DIFFING PRIOR EXECUTIONS OF AN EXECUTABLE PROGRAM

CROSS-REFERENCE TO RELATED APPLICATIONS

The present application is a U.S. National Stage of International Application No. PCT/US2022/072041, filed on 2 May 2022, designating the United States and claiming the priority of Luxembourg Patent Application No. LU500131 filed with the Luxembourg Intellectual Property Office on 6 May 2021. All of the aforementioned applications are incorporated herein in their respective entireties by this reference.

TECHNICAL FIELD

The present disclosure relates to systems, methods, and devices that analyze replayable execution traces for identification of execution behaviors.

BACKGROUND

Tracking down and correcting undesired software behaviors/faults is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the at least a portion of an execution context (e.g., process, thread, etc.) of an executable computer program is recorded into one or more trace files (i.e., an execution trace). Using some tracing techniques, an execution trace contains "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using bit-accurate trace data, diagnostic tools enable developers to reason about a recorded prior execution of an executable program, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Since modern processors commonly execute at the rate of tens- to hundreds- of thousands of MIPS (millions of instructions per second), replayable execution traces of executing code can generate vast amounts of information, even if mere fractions of a second are captured. As such, analyzing and presenting information about execution traces can present significant technical hurdles.

BRIEF SUMMARY

At least some embodiments described herein diff prior executions of an executable program based on replayable execution traces. In particular, the embodiments disclosed herein identify ordered sets of entities (e.g., function calls, kernel calls, telemetry datapoints, etc.) from different execution traces of an executable program; for instance, if the entities are function calls, each ordered set represents an ordered set of function calls made by a different traced prior execution context of the executable program. In embodiments, ordered sets are converted to, or treated as, strings of characters, with each character in a string representing a different entity in an ordered set. The embodiments disclosed herein then compute an edit distance between these ordered sets. This edit distance, in turn, is used by the embodiments disclosed herein to quantify how similar (or dissimilar) those ordered sets are. By quantifying how similar/dissimilar ordered sets (or strings) are, embodiments disclosed herein also quantify how similar/dissimilar corresponding prior executions of the executable program were. By identifying similarities and dissimilarities between prior executions of an executable program, embodiments disclosed herein can identify anomalous prior executions and, thus, prior executions during which undesired software behaviors/faults (e.g., execution crashes, runtime exceptions, slow execution performance, incorrect data results, data corruption) occurred.

When computing edit distances between ordered sets, the embodiments disclosed herein apply novel entity weighting, search space partitioning, and replacement restriction techniques in order to greatly reduce a number of computations that are needed in order to arrive at an edit distance for two given ordered sets, as compared to more traditional edit distance computation techniques. As such, application of the novel entity weighting, search space partitioning, and replacement restriction techniques disclosed herein bring about a technical effect of greatly reducing usage of computing resources, including both processor cycles and memory usage, as compared to more traditional string/graph comparison techniques. As result, the embodiments herein enable a computer system to efficiently analyze the vast amounts of information captured by execution traces, in order to pinpoint prior executions during which undesired software behaviors/faults occurred. As mentioned, modern processors commonly execute at the rate of tens- to hundreds- of thousands of MIPS, generating vast amounts of information in execution traces. This can result in ordered sets (derived from execution traces) that contain billons of entities, and on contemporary computing hardware the novel entity weighting, search space partitioning, and replacement restriction techniques disclosed herein can reduce analysis time of these ordered sets from days to hours, or even to a few minutes. This improved analysis, in turn, facilitates resolution of undesired software behaviors that are identified by the improved analysis. As a result, this improved analysis leads to better working (e.g., more reliable, more performant, etc.) computer systems.

In some embodiments, methods, systems, and computer program products for diffing prior executions of an executable program include identifying a first ordered set comprising a first plurality of entities obtained from a first trace of a first execution context of the executable program and identifying a second ordered set comprising a second plurality of entities obtained from a second trace of a second execution context of the executable program. These embodiments also include assigning a weighting to each entity type in the first plurality of entities and the second plurality of entities, including at least assigning a first weighting to a first entity type and assigning a second weighting to a second entity type, the first weighting being different than the second weighting. These embodiments also include calculating an edit distance between the first ordered set and the second ordered set, including. Calculating the edit distance comprises creating a diffing structure from the first ordered set and the second ordered set and calculating a minimal cost path through the diffing structure. The minimal cost path starts at a first entry representing an intersection between an empty first ordered set and an empty second ordered set, and ends at a second entry representing an intersection between an entire first ordered set and an entire second ordered set. The edit distance is based on a calculated cost at the second entry. In embodiments, calculating the minimal cost path including, for at least two iterations, (a) identifying a partition of the diffing structure based on identifying an intersecting entry that is selected based on (i) only permitting replacements between entities in the first ordered set and the second ordered set that have a common entity type, and (ii) utilizing at least a difference between the first weighting and the second weighting to identify a single-entity replacement across the first ordered set and the second ordered set that has a higher replacement cost than an adjoining multi-entity replacement across the first ordered set and the second ordered set; and (b) applying a differencing algorithm to the partition, in order to identify a corresponding segment of the minimal cost path, the corresponding segment beginning or ending with the intersecting entry. These embodiments also include outputting the edit distance to a software component or to another computer system, and which causes the software component or to the other computer system to operate on the edit distance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates an example debugging component that diffs prior executions of an executable program based on replayable execution traces;

FIG. 7A illustrates an example of a dynamic programming graph traversal (Levenshtein distance) edit distance calculation within a diffing matrix;

FIG. 7B illustrates an example of a Dijkstra's algorithm edit distance calculation within a diffing matrix;

FIG. 7C illustrates an example of an A* algorithm edit distance calculation within a diffing matrix, using a conventional prediction heuristic;

FIG. 8A illustrates an example of an A* algorithm edit distance calculation within a diffing matrix, using a prediction heuristic based on only permitting replacements of identical characters;

FIG. 8B illustrates an example of partitioned edit distance calculation within a diffing matrix;

FIG. 8C illustrates an example of partitioned edit distance calculation within a diffing matrix, with partitions from FIG. 8B swapped.

DETAILED DESCRIPTION

Figure 1A:
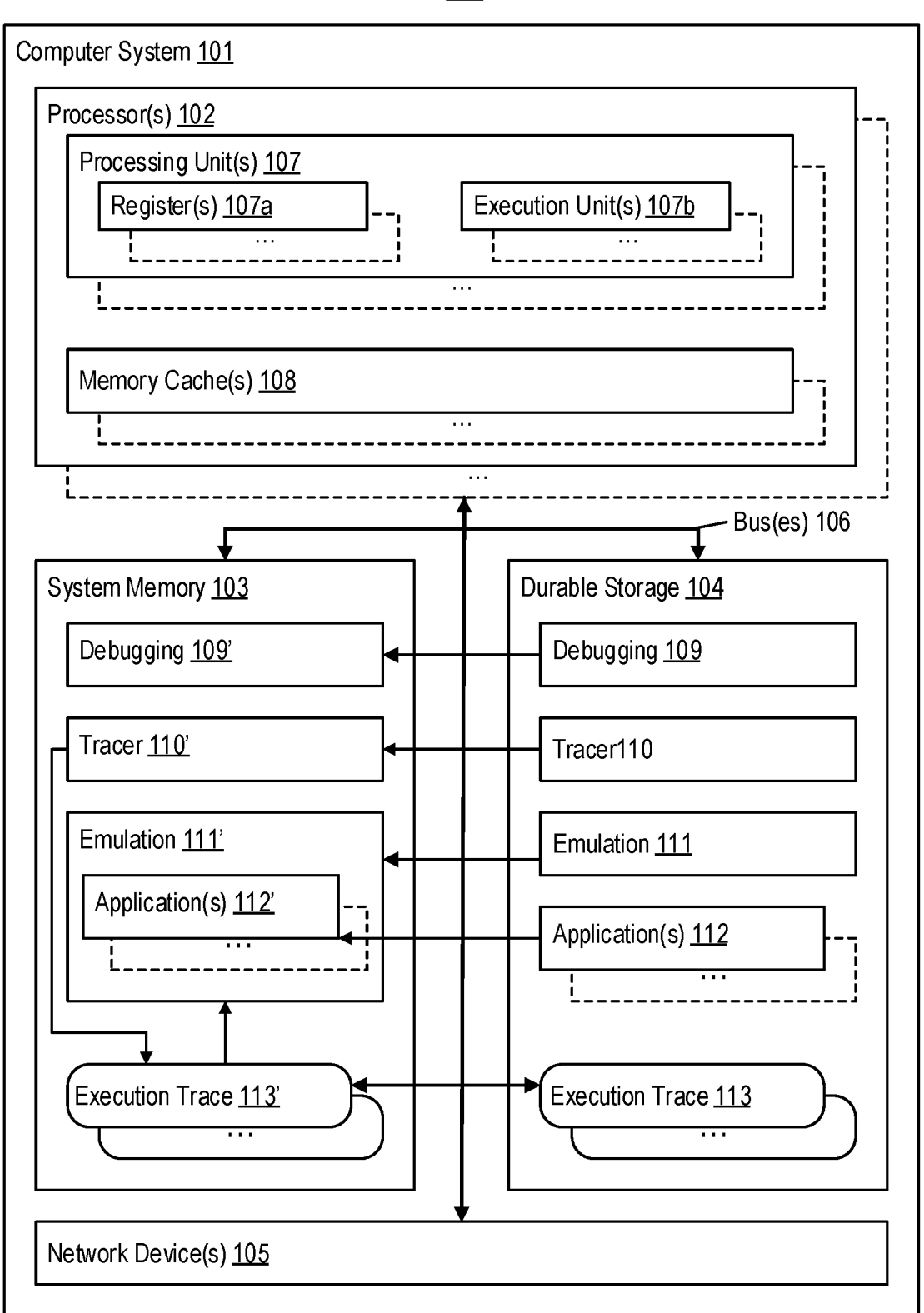
FIG. 1A illustrates an example computing environment that facilitates diffing prior executions of an executable program based on replayable execution traces.

As mentioned, at least some embodiments described herein are directed to diffing prior executions of an executable program, based on replayable execution traces of that executable program. In embodiments, an execution trace used by the embodiments herein is generated by one or more of a variety of historic debugging technologies. In general, historic debugging technologies record or reconstruct the state of an execution context (e.g., process, thread, etc.) at various times as code of a corresponding executable computer program executes, in order to enable that execution context to be at least partially replayed from that execution state. The fidelity of that virtual execution varies depending on what traced execution state is available.

In one example, some classes of historic debugging technologies, referred to herein as time-travel debugging, continuously record a bit-accurate trace of an execution context. This bit-accurate trace can then be used later to faithfully replay that execution context's prior execution down to the fidelity of individual code instructions. For example, a bit-accurate trace records information sufficient to reproduce initial processor state for at least one point in an execution context's prior execution (e.g., by recording a snapshot of processor registers), along with the data values that were read by the executable instructions as they executed after that point in time (e.g., the memory reads). This bit-accurate trace can then be used to replay execution of those executable instructions (starting with the initial processor state) based on supplying the instructions with the recorded reads.

Another class of historic debugging technology, referred to herein as branch trace debugging, relies on reconstructing at least part of an execution context's state based on working backwards from a dump or snapshot (e.g., a crash dump) that includes a processor branch trace (i.e., which includes a record of whether or not branches were taken). These technologies start with values (e.g., memory and register) from this dump or snapshot and, using the branch trace to at least partially determine code execution flow, iteratively replay the code instructions that executed as part of the execution context, backwards and forwards, in order to reconstruct intermediary data values (e.g., register and memory) used by the code instructions until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an execution context's memory space and processor registers while it executes. If the execution context relies on data from sources other than the execution context's own memory, or from a non-deterministic source, in embodiments these technologies also record such data along with the snapshots. These technologies then use the data in the snapshots to replay the execution of an executable program's code between snapshots.

FIG. 1A illustrates an example computing environment 100 that facilitates diffing prior executions of an executable program, based on replayable execution traces of that executable program. As illustrated, computing environment 100 includes a computer system 101 (e.g., a special-purpose or general-purpose computing device), which includes a processor 102 (or a plurality of processors). As shown, in addition to processor 102, computer system 101 also includes system memory 103, durable storage 104, and potentially a network device 105 (or a plurality of network devices), which are communicatively coupled to each other, and to the processor 102, using at least one communications bus 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network (e.g., network device 105) or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments the processor 102 includes, for example, a processing unit 107 (or a plurality of processing units) and a memory cache 108 (or a plurality of memory caches). Each processing unit 107 (e.g., processor core) loads and executes machine code instructions on at least one of a plurality of execution units 107b. During execution of these machine code instructions, the instructions can use registers 107a as temporary storage locations, and can read and write to various locations in system memory 103 via the memory cache 108. Each processing unit 107 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. As generally understood, a machine code instruction is the smallest externally-visible (i.e., external to the processor) unit of code that is executable by a processor.

Registers 107a are hardware storage locations that are defined based on the ISA of the processor 102. Registers 107a are read from and/or written to by machine code instructions, or a processing unit 107, as those instructions execute at execution units 107b. Registers 107a are commonly used to store values fetched from the memory cache 108 for use as inputs to executing machine code instructions, to store the results of executing machine code instructions, to store a program instruction count, to support maintenance of a thread stack, etc. In some embodiments, registers 107a include "flags" that are used to signal some state change caused by executing machine code instructions (e.g., to indicate if an arithmetic operation cased a carry, a zero result, etc.). In some embodiments, registers 107a include one or more control registers (e.g., which are used to control different aspects of processor operation), and/or other processor model-specific registers (MSRs).

The memory cache 108 temporarily caches blocks of system memory 103 during execution of machine code instructions by processing unit 107. In some implementations, the memory cache 108 includes one or more "code" portions that cache portions of system memory 103 storing application code, as well as one or more "data" portions that cache portions of system memory 103 storing application runtime data. If a processing unit 107 requests data (e.g., code or application runtime data) not already stored in the memory cache 108, then the processing unit 107 initiates a "cache miss," causing one or more blocks of data to be fetched from system memory 103 and influxed into the memory cache 108—while potentially replacing and "evicting" some other data already stored in the memory cache 108 back to system memory 103.

As illustrated, the durable storage 104 stores computer-executable instructions and/or data structures representing executable software components; correspondingly, during execution of this software at processor 102, one or more portions of these computer-executable instructions and/or data structures are loaded into system memory 103. For example, the durable storage 104 is shown as potentially storing computer-executable instructions and/or data structures corresponding to a debugging component 109, a tracer component 110, an emulation component 111, and an application 112 (or a plurality of applications). The durable storage 104 can also store data, such as replayable execution traces 113 (which are, for example generated by the tracer component 110 using one or more of the historic debugging technologies described above).

In embodiments, the debugging component 109 leverages the emulation component 111 in order to emulate execution of code of executable entities, such as application 112, based on execution state data obtained from one of replayable execution traces 113. Thus, FIG. 1A shows that the debugging component 109 and the emulation component 111 are loaded into system memory 103 (i.e., debugging component 109' and emulation component 111'), and that execution of an application 112 is being emulated within the emulation component 111' (i.e., application 112'). As will be explained in more detail in connection with FIG. 1B, the debugging component 109 provides functionality for diffing prior executions of an executable program, based on replayable execution traces of that executable program. In embodiments, the debugging component 109 is a tool (e.g., a debugger, a profiler, a cloud service, etc.) that consumes one or more of replayable execution traces 113 as part of analyzing a prior execution of an application 112.

The tracer component 110 records or "traces" execution of an application 112 into one or more of replayable execution traces 113. In some embodiments, the tracer component 110 records execution of an application 112 when that execution is a "live" execution on processor 102 directly, when that execution is a "live" execution on processor 102 via a managed runtime, and/or when that execution is an emulated execution via the emulation component 111. Thus, FIG. 1A also shows that the tracer component 110 is also loaded into system memory 103 (i.e., tracer component 110'). An arrow between tracer component 110' and replayable execution traces 113' indicates that the tracer component 110' records trace data into one or more of replayable execution traces 113', which may then be persisted to the durable storage 104 as one or more of replayable execution traces 113.

Figure 2:
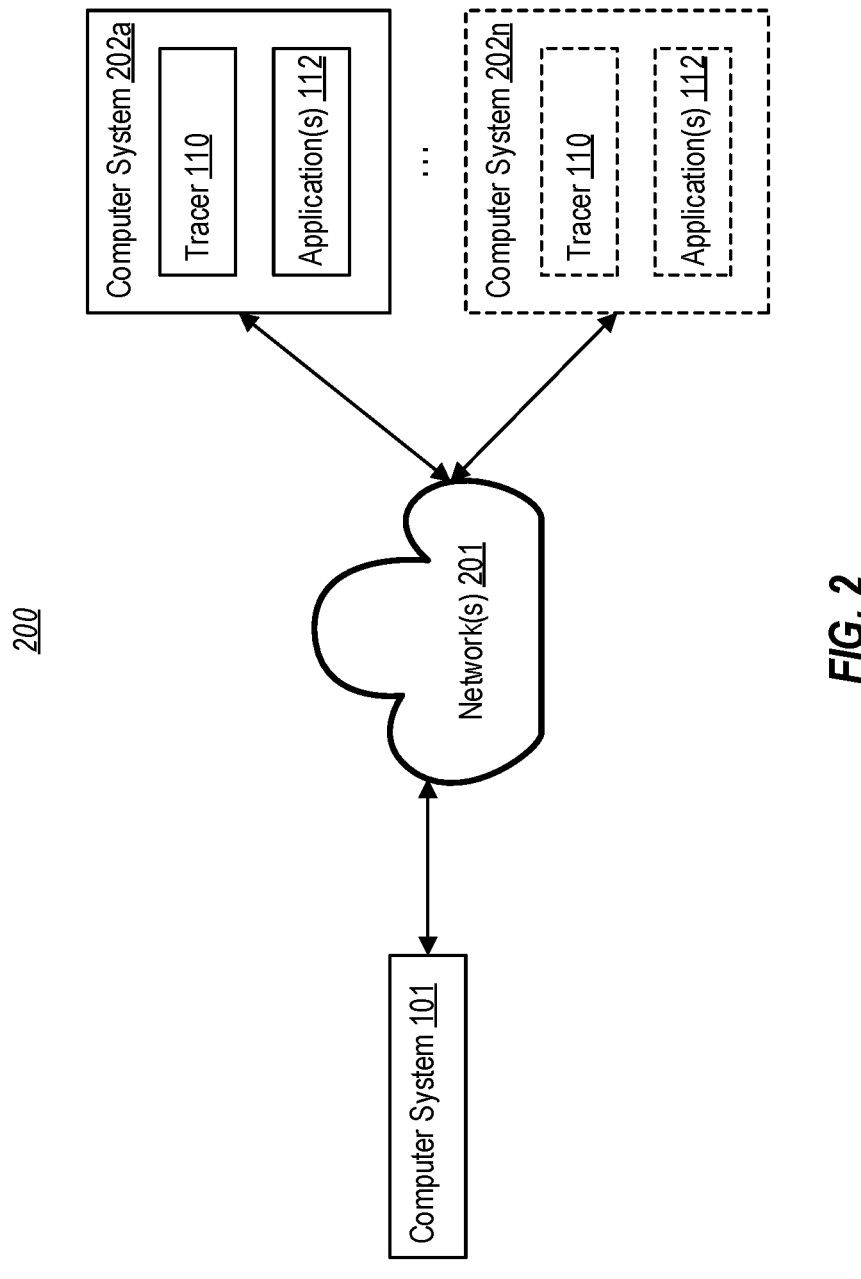
FIG. 2 illustrates an example computing environment in which the computer system of FIG. 1A is connected to one or more other computer systems over one or more networks.

In some embodiments, computer system 101 additionally, or alternatively, receives a one or more of replayable execution traces 113 from another computer system (e.g., using network device 105). For example, FIG. 2 illustrates an example computing environment 200, showing computer system 101 of FIG. 1A as being connected to a remote computer system 202 (or a plurality of remote computer systems; i.e., remote computer system 202a to remote computer system 202n) over a network 201 (or a plurality of networks). As shown in example computing environment 200, each remote computer system 202 includes a tracer component 110 and an application 112. As such, computer system 101 may receive, over network 201, one or more replayable execution traces of at least one prior execution of an application 112 at a remote computer system 202.

Figure 3:
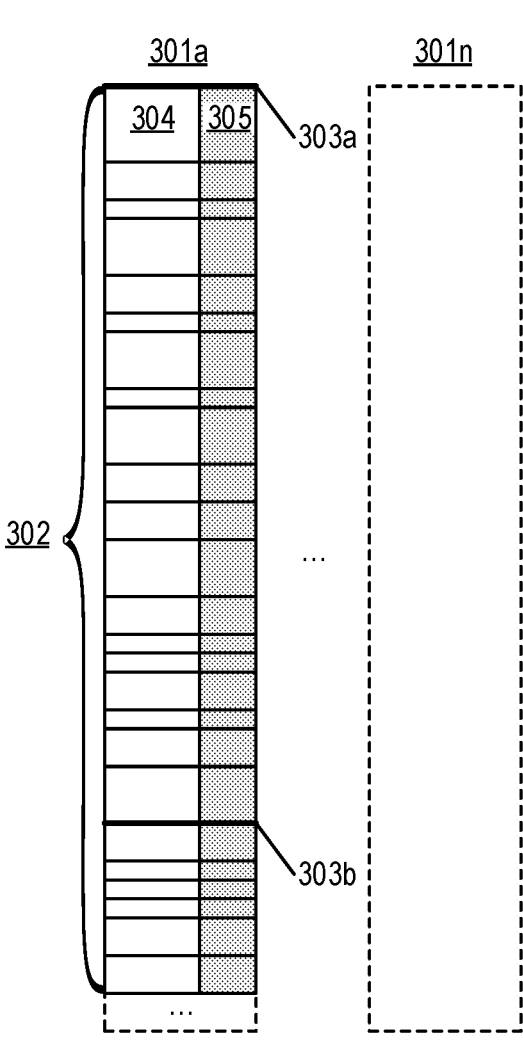
FIG. 3 illustrates an example of an execution trace.

FIG. 3 illustrates an example of an execution trace. In particular, FIG. 3 illustrates an execution trace 300 that includes a plurality of data streams 301 (i.e., data streams 301a-301n). In embodiments, each of data streams 301 represents execution of a different execution context, such as a different thread that executed from application 112. In an example, data stream 301a records execution of a first thread of application 112, while data stream 301n records an $n^{th}$ thread of application 112. As shown, data stream 301a comprises a plurality of data packets 302. Since the particular data logged in each of data packets 302 can vary, these data packets are shown as having varying sizes. In embodiments, when using time-travel debugging technologies, one or more of data packets 302 records the inputs (e.g., register values, memory values, etc.) to one or more executable instructions that executed as part of this first thread of application 112. In embodiments, memory values are obtained as influxes to memory cache 108 and/or as uncached reads. In embodiments, data stream 301a also includes one or more key frames 303 (e.g., key frames 303a and 303b), each capturing sufficient information (e.g., such as a snapshot of register and/or memory values) to enable the prior execution of the thread to be replayed-starting at the point of the key frame and proceeding forward.

In embodiments, an execution trace also includes the actual code that was executed. Thus, in FIG. 3, each of data packets 302 is shown as including a data inputs portion 304 (non-shaded) and a code portion 305 (shaded). In embodiments, the code portion 305 of each of data packets 302, if present, includes the executable instructions that executed based on the corresponding data inputs. In other embodiments, however, an execution trace omits the actual code that was executed, instead relying on having separate access to the executable code (e.g., a copy of application 112). In these other embodiments, each data packet specifies an address or offset to an appropriate executable instruction in an application binary image. Although not shown, it is possible that the execution trace 300 includes a data stream that stores one or more of the outputs of code execution. It is noted that used of different data input and code portions of a data packet is for illustrative purposes only, and that the same data could be stored in a variety of manners, such as by the use of multiple data packets.

If there are multiple data streams, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream 10) (e.g., data stream 301a) writes to a synchronization variable, a first sequencing event is recorded into that data stream (e.g., data stream 301a). Later, if a second thread that is traced into a second data stream (e.g., data stream 301b) reads from that synchronization variable, a second sequencing event is recorded into that data stream (e.g., data stream 301b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc. It is noted that while, in some embodiments, the debugging component 109, the tracer component 110, and/or the emulation component 111 are each independent components or applications, in other embodiments they are alternatively integrated into the same application (such as a debugging suite), or are integrated into another software component-such as an operating system component, a hypervisor, a cloud fabric, etc. As such, those skilled in the art will also appreciate that the invention may be practiced in a cloud computing environment that includes computer system 101. For instance, while in some embodiments these components take the form of one or more software applications executed at a user's local computer, in other embodiments they take the form of a service provided by a cloud computing environment.

It was mentioned previously that the debugging component 109 provides functionality for diffing prior executions of an executable program (e.g., application 112), based on replayable execution traces (e.g., replayable execution traces 113) of that executable program. In embodiments, the debugging component 109 identifies ordered sets of entities (e.g., function calls, kernel calls, telemetry datapoints, etc.) from different execution traces of an executable program, and then uses string and/or graph comparison techniques to compute and output an edit distance between these ordered sets. In embodiments, this edit distance is usable (e.g., by a software component at computer system 101, or at another computer system) to quantify how similar (or dissimilar) those ordered sets are, and thus how similar/dissimilar corresponding prior executions of the executable program were. By identifying similarities and dissimilarities between prior executions of an executable program, the debugging component 109 herein can output an identification of anomalous prior executions and, thus, prior executions during which undesired software behaviors/faults (e.g., execution crashes, runtime exceptions, slow execution performance, incorrect data results, data corruption) occurred.

In embodiments, when computing edit distances between ordered sets, the debugging component 109 applies novel entity weighting, search space partitioning, and replacement restriction techniques in order to greatly reduce a number of computations that are needed in order to arrive at an edit distance for two given ordered sets (as compared to more traditional string/graph comparison techniques). As such, the debugging component 109 efficiently calculates edit distances from vast amounts of information captured by replayable execution traces 113, enabling the identification of prior executions during which undesired software behaviors/faults occurred. In doing so, and as will be demonstrated the debugging component 109 consumes significantly fewer computing resources—including both processor cycles and memory usage—as compared to edit distances calculations that use more traditional string/graph comparison techniques.

In general, the debugging component 109 operates on ordered sets of entities, which can be viewed as character strings, with each character representing a corresponding entity; in one example, entities are function calls identified in an execution trace, and unique characters in those strings correspond to calls to corresponding functions, or even to families of functions. In one example, the character 'A' corresponds to calls to functions (e.g., a malloc( ) function and a calloc( ) function) withing a family of memory allocation functions, character 'B' corresponds to calls to a free( ) function, and calls to character 'C' correspond to a call to a random( ) function. The debugging component 109 computes an edit distance between those strings. There are several well-known techniques for calculating an edit distance, such as dynamic programming (DP) graph traversal (e.g., Levenshtein distance), Dijkstra's algorithm, and the A* algorithm. In any of these algorithms, two strings are operated in on in the form of a diffing structure, such as a diffing matrix of cells and/or a diffing graph of nodes.

Figure 4:
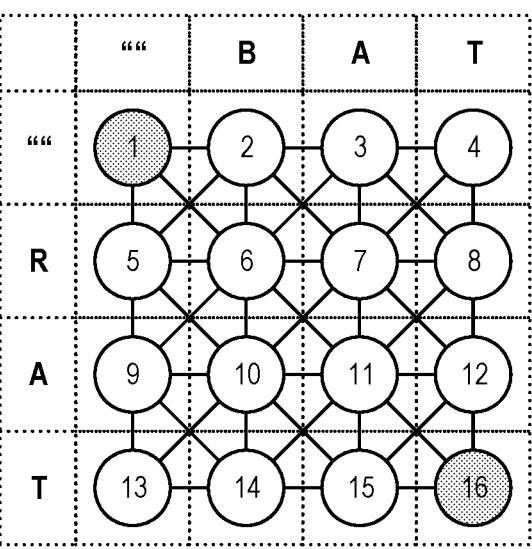
FIG. 4 illustrates an example of diffing structures for comparing the strings "BAT" and "RAT"

To demonstrate, FIG. 4 illustrates an example 400 of diffing structures for comparing the strings "BAT" and "RAT." As shown, in diffing matrix form, the characters of the strings are arranged in rows and columns of cells (i.e., the characters of "BAT" as column headers and the characters of "RAT" as row headers), starting with row and column representing an empty string (" "). As demonstrated, in diffing graph form, the nodes of the graph correspond to the intersections between individual characters of the subject strings, and thus substrings up to, and including, those characters (e.g., node one for an empty string on both sides of the comparison, node seven for the intersection of the character 'A' in "BAT" (thus, the "BA" substring) and the character 'R' in "RAT" (thus, the "R" substring), node sixteen for the intersection of the character 'T' in "BAT" (thus, the full "BAT" string) and the character 'T' in "RAT" (thus, the full "RAT" string), etc. In general, whether operating on a matrix or a graph, algorithms for edit distance calculate a value for each diffing structure entry (i.e., matrix cell or graph node), which represents a cost for transforming one substring (or full string) into another substring (or full string). For example, a cost assigned to node one is the cost of transforming an empty string on the "BAT" side of the comparison into an empty string on the "RAT" side of the comparison, a cost assigned to node nine is the cost of transforming an empty string on the "BAT" side of the comparison into the substring "RA" on the "RAT" side of the comparison, a cost assigned to node ten is the cost of transforming the substring "B" on the "BAT" side of the comparison into the substring "RA" on the "RAT" side of the comparison, a cost assigned to node sixteen is the cost of transforming the full string "BAT" into the full string "RAT," etc. Often, algorithms for edit distance calculations start with empty strings (i.e., shaded node one) and work towards full strings (i.e., shaded node sixteen).

Figure 5:
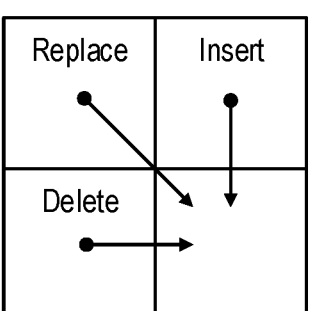
FIG. 5 illustrates an example of entries that are used as the basis for replacements, insertions, and deletions for a subject entry.

For a given diffing structure entry, edit distance calculations combine a cost of prior entries, plus an additional cost for either a replacement (i.e., swapping one character for another), an insertion (i.e., inserting a character from one string into the other string), or a deletion (i.e., deleting a character from one string). While techniques may vary, FIG. 5 shows an example 500, such as within the diffing matrix of example 400, of entries that are used as the basis for replacements, insertions, and deletions for a subject entry. In example 500, for a given entry (matrix cell, in this example), replacements are calculated based on a diagonally related cell, insertions are calculated based on a vertically related cell, and deletions are calculated based on a horizontally related cell. It will be appreciated, however, that depending on implementation choices (e.g., a layout of the diffing matrix), these positions could vary.

Figure 6A:
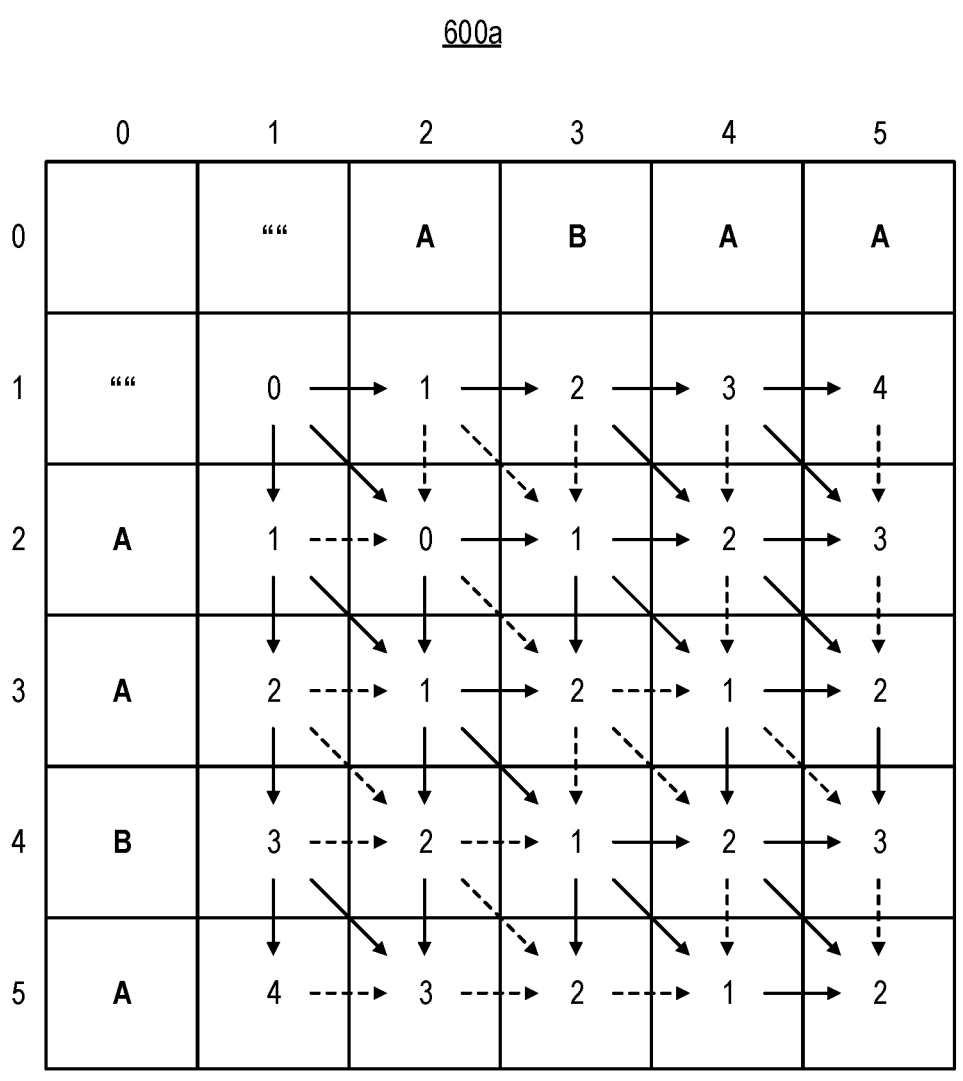
FIG. 6A illustrates an example of conventional calculations for computing edit distance for the strings "ABAA" and "AABA" within a diffing matrix.

Within the context of FIGS. 4 and 5, FIG. 6A illustrates an example 600*a* of conventional calculations for computing edit distance for the strings "ABAA" (top string) and "AABA" (left string) within a diffing matrix. In one example, the calculations in example 600*a* are based on DP graph traversal. Starting with row 1 (for an empty string), each column is initialized with a cost of progressively inserting each character of the top string into an empty string, starting with an empty character (i.e., cell (1,1)), and proceeding though the characters 'A' (i.e., cell (1,2)), 'B' (i.e., cell (1,3)), 'A' (i.e., cell (1,3)), and 'A' (i.e., cell (1,4)). Similarly, in column 1, each row is initialized with a cost of progressively inserting each character of the left string into an empty string, proceeding though the characters 'A' (i.e., cell (2,1)), 'A' (i.e., cell (3,1)), 'B' (i.e., cell (3,1)), and 'A' (i.e., cell (4,1)).

At each remaining entry, the cost of the entry is determined based on choosing the minimum of a replacement, an insertion, and a deletion. Here, a replacement for identical characters adds a cost of zero, a replacement of differing characters adds a cost of one, and insertions/deletions add a cost of one. For example, the cost at cell (2,2) is computed based on choosing the minimum of (i) zero for a replacement (i.e., zero for the cost of cell (1,1) plus zero for the cost of replacing the character 'A' in the left string for the character 'A' in the top string), two for an insertion of the character 'A' from the top string into the left string (i.e., one for the cost of cell (1,2) plus the one for the cost of insertion), or two for a deletion of the character 'A' from the left string (i.e., one for the cost of cell (1,2) plus one for the cost of deletion); here, the replacement cost (i.e., zero) is the minimum, so cell (2,2) is assigned a cost of zero. In another example, the cost at cell (2,3) is computed based on choosing the minimum of (i) two for a replacement (i.e., one for the cost of cell (1,2) plus one for the cost of replacing the character 'A' in the left string for the character 'B' in the top string), three for an insertion of the character 'B' from the top string into the left string (i.e., two for the cost of cell (1,3) plus the one for the cost of insertion), or one for a deletion of the character 'A' 30) from the left string (i.e., zero for the cost of cell (2,2) plus one for the cost of deletion); here, the deletion cost (i.e., one) is the minimum, so cell (2,3) is assigned a cost of one. In yet another example, the cost at cell (5,5) is computed based on choosing the minimum of (i) two for a replacement (i.e., two for the cost of cell (4,4) plus zero for the cost of replacing the character 'A' in the left string for the character 'A' in the top string), four for an insertion of the character 'A' from the top string into the left string (i.e., three for the cost of cell (4,5) plus the one for the cost of insertion), or two for a deletion of the character 'A' from the left string (i.e., one for the cost of cell (5,4) plus one for the cost of deletion); here, the both the replacement cost (i.e., two and the deletion cost (i.e., two) are the minimum, so cell (5,5) is assigned a cost of two.

Since cell (5,5) is the intersection of the two full strings, the edit distance between "ABAA" and "AABA" is two. In example 600a, fifty-six arrows are used to show all comparisons used to arrive at this edit distance, with solid arrows indicating which comparison(s) resulted in the cost for a given entry, and broken arrows indicating which comparison(s) did not contribute to the cost for a given entry.

Figure 6B:
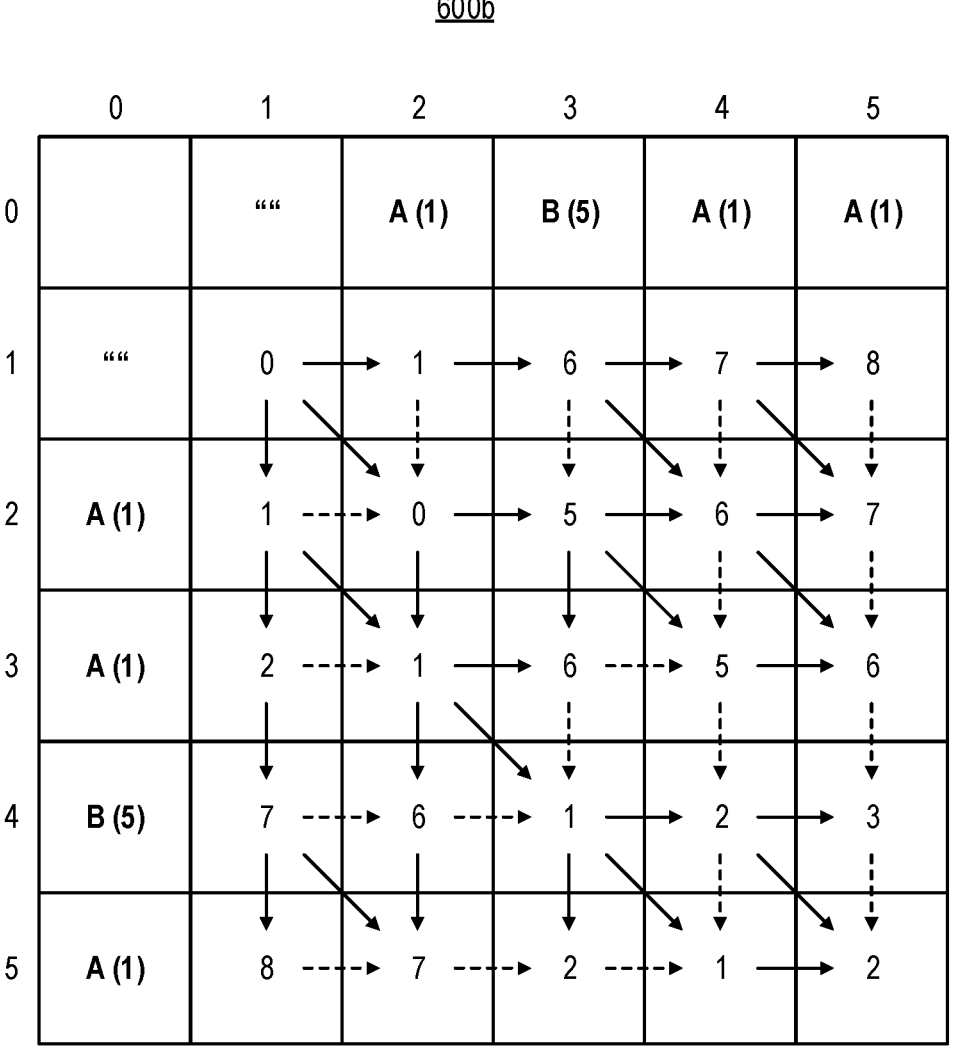
FIG. 6B illustrates an example of improved calculations for computing edit distance for the strings "ABAA" and "AABA" within a diffing matrix.

In accordance with the novel techniques herein, the debugging component 109 computes edit distance based on one or both of (i) assigning different weightings to different string characters, and (ii) restricting calculations for replacements using non-matching characters. To demonstrate, FIG. 6B illustrates an example 600a of improved calculations for computing edit distance for the strings "ABAA" (top string) and "AABA" (left string) within a diffing matrix. Similar to example 600a, in example 600b row 1 is initialized with a cost of progressively inserting each character of the top string into an empty string, and column 1 is initialized with a cost of progressively inserting each character of the left string into an empty string. However, unlike example 600a the character A is given a weight of one, while character B is given a weight of five. Thus, insertion of the character B adds five to the cost, instead of one.

At each remaining entry, the cost of the entry is determined based on choosing the minimum of a replacement, an insertion, and a deletion—while only computing replacement costs if there is a replacement of identical characters. Thus, a replacement adds a cost of zero, and insertions/deletions add a cost of either one (when inserting/deleting an A) or five (when inserting/deleting a B). For example, the cost at cell (2,2) is computed based on choosing the minimum of (i) zero for a replacement (i.e., zero for the cost of cell (1,1) plus zero for the cost of replacing the character 'A' in the left string for the character 'A' in the top string), two for an insertion of the character 'A' from the top string into the left string (i.e., one for the cost of cell (1,2) plus the one for the cost of insertion of the character 'A'), or two for a deletion of the character 'A' from the left string (i.e., one for the cost of cell (1,2) plus one for the cost of deletion); here, the replacement cost (i.e., zero) is the minimum, so cell (2,2) is assigned a cost of zero, just like example 600a. In another example, the cost at cell (2,3) is computed based on choosing the minimum of seven for an insertion of the character 'B' from the top string into the left string (i.e., six for the cost of cell (1,3) plus the one for the cost of insertion of the character 'A'), or five for a deletion of the character 'B' from the left string (i.e., zero for the cost of cell (2,2) plus five for the cost of deletion of the character 'B'); here, the deletion cost (i.e., five) is the minimum, so cell (2,3) is assigned a cost of five. Unlike in example 600a, the computation of a replacement cost was avoided since cell (2,3) would have concerned a replacement of non-matching characters.

In example 600b, only fifty arrows (rather than fifty-six arrows, as in example 600a) are used to show all comparisons used to arrive at this edit distance (with solid arrows indicating which comparison(s) resulted in the cost for a given entry, and broken arrows indicating which comparison(s) did not contribute to the cost for a given entry). Here, restricting calculations for replacements using non-matching characters has led to the same result, while avoiding six comparisons. As shown in cell (5,5), the edit distance between "ABAA" and "AABA" is two. Even though the characters 'A' and 'B' were weighted differently, this edit distance is the same as in example 600a since there is a single character swap between the two strings. However, as will be discussed infra, use of weightings can enable a partitioned analysis that significantly reduces computations further.

FIGS. 7A-7B now demonstrate various edit distance calculations of the strings "AAAAAAAA-BAAAAAAAAAACA" and "AAAABAAACAAA-BAAAA," where the character 'A' is assigned a weighting of one, the character 'B' is assigned a weighting of five, and the character 'C' is assigned a weighting of ten. As mentioned, in embodiments characters correspond to functions and/or function families, so these strings could correspond to traced series of function calls from different execution traces. In various embodiments the weightings are based on entropy (e.g., less frequent characters have a higher weighting), on an amount of work performed by the corresponding function (e.g., based on a number of executable instructions executed), or even based on a human categorization.

Initially, FIG. 7A illustrates an example 700a of a DP graph traversal (Levenshtein distance) edit distance calculation of the aforementioned strings within a diffing matrix, and which calculates insertion and deletion costs based on weightings of each character type. As shown, in some implementations, the edit distance of the aforementioned strings is twenty-two, and in embodiments it takes DP graph traversal at least 396 comparisons to arrive at this result. In embodiments, when used to calculate the edit distance between strings, the DP graph traversal algorithm has a runtime complexity characterized as $O(n*m)$, where n and m are the length of the strings being compared.

Next, FIG. 7B illustrates an example 700b of a Dijkstra's algorithm edit distance calculation of the aforementioned strings within a diffing matrix, and which calculates insertion and deletion costs based on weightings of each character type. In general, Dijkstra's algorithm operates by traversing to the next cheapest entry when given a choice between two or more entries. As shown, when using Dijkstra's algorithm, the edit distance of the aforementioned strings is again twenty-two, and in embodiments Dijkstra's algorithm visits (processes/calculates) at least 328 nodes and reaches 347 nodes to arrive at this result. In embodiments, when used to calculate the edit distance between strings, Dijkstra's algorithm has a runtime complexity characterized as $O(E+V*\log V)$, where V is the number of entries (nodes), and E is the number of edges, in the graph being traversed.

FIG. 7C illustrates an example 700c of an A* algorithm edit distance calculation of the aforementioned strings within a diffing matrix, and which calculates insertion and deletion costs based on weightings of each character type. In general, the A* algorithm operates by traversing to an entry estimated to be cheaper based on the cost of the current entry, and prediction of cost remaining. Thus, the A* algorithm utilizes a heuristic to estimate, at each entry, a minimum cost remaining to reach the entry representing the total edit distance (e.g., the bottom-right node in example 700c). In example 700c, this is a conventional heuristic that computes, for a given entry, a difference between the number of characters left in each comparison string. For instance, in example 700c, the cell corresponding to an intersection between the 'B' character in the top string and the 'C' character in the left string is assigned a cost of seventeen, with a predicted remaining cost of four. The predicted remaining cost of four is calculated based on the difference between the number of characters remaining eft in the top string (i.e., AAAAAAAAAACA, or twelve characters) and the number of characters remaining in the left string (i.e., AAABAAAA or eight characters). As shown, the edit distance of the aforementioned strings is again twenty-two, and in embodiments it takes the A* algorithm using this conventional heuristic at least 113 comparisons to arrive at this result. In embodiments, when used to calculate the edit distance between strings, the A* algorithm has a runtime complexity characterized as $O(b^d)$, where b is a branching factor (the average number of successors per state), and d is depth of the solution (i.e., the shortest path).

In embodiments, the debugging component 109 utilizes a novel constant-cost heuristic to the A* algorithm, which is based on prohibiting replacements for non-matching characters, and which reduces the number of comparisons needed to arrive at an edit distance. In particular, since character types cannot "cross" on a replacement, this heuristic makes a prediction of a minimum cost to be paid for each unique character type. To demonstrate, FIG. 8A illustrates an example 800a of an A* algorithm edit distance calculation of the aforementioned strings within a diffing matrix, and which also calculates insertion and deletion costs based on weightings of each character type and uses a heuristic that makes a prediction of a minimum cost to be paid for each unique character type. For instance, in example 800a, the cell corresponding to an intersection between the 'B' character in the top string and the 'C' character in the left string is again assigned a cost of seventeen, with a predicted remaining cost of "−B+4A+C," or a total predicted cost of nineteen. This predicted remaining cost determined based on the difference between the number of each character type remaining in the top string and the number of each character type remaining in the left string, and accounting for the weight of those characters (i.e., (1×5)+(4×1)+(1×10)). For instance, the top string has the characters "AAAAAAAAAACA" remaining, which is eleven 'A' characters and one 'C' character, while the left string has the characters "AAABAAAA" remaining, which is seven 'A' characters and one 'B' character. This means that, to transform "AAAAAAAAAACA" into "AAABAAAA" with a restriction of not crossing character types, the remaining cost is a least to remove one 'B' character from the left string with a weight of five for that character, to add at least four 'A' characters on the top string with a wright of one each, and to remove at least one 'C' character from the top string with a weight of ten for that character. As shown, the edit distance of the aforementioned strings is again twenty-two, and in embodiments it takes the A* algorithm using this novel heuristic only 113 comparisons to arrive at this result.

Regardless of the algorithm used to calculate edit distance, in embodiments the debugging component 109 relies on character/entity weighting, and on the restriction of replacements to only identical character/entity types, in order to partition the edit distance calculation and facilitate replacement of entire substrings of identical lower-weighted characters with a single higher-weighted character. More particularly, the embodiments herein use weightings to identify entries that correspond to a local optimal that is guaranteed to be part of the global optimal. This is accomplished by using varying character weightings to identify entries representing replacements of identical characters across two strings, where that replacement has a cost that dominates in a local substring region; if the cost of that character replacement is less than the cost of replacing a series of preceding lower-cost characters, then the diffing structure can be partitioned into a subsection that has that entry as a known exit point. Then, that subsection can be solved using one of the preceding edit distance calculation algorithms, with that exit point as the destination. In embodiments, an entry is determined to dominate when a predicted cost of its preceding entries is less than the cost of the entry itself.

Figure 8B:
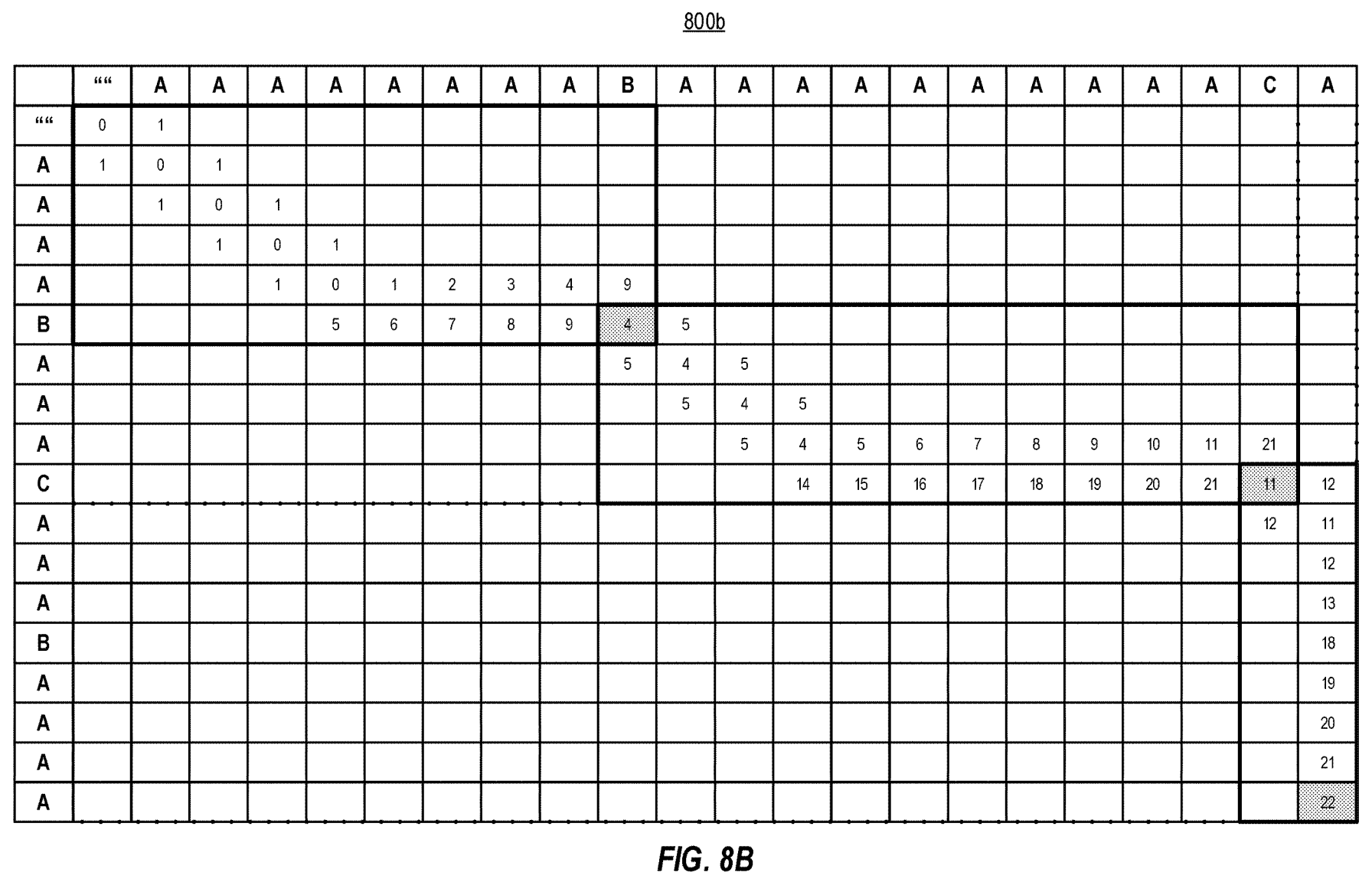

To demonstrate, FIG. 8B illustrates an example 800b of a partitioned edit distance calculation of the aforementioned strings within a diffing matrix, and which utilizes an A* algorithm using the heuristic described above that makes a prediction of a minimum cost to be paid for each unique character type. In example 800b, there are two identified entries that correspond to local optimals that are each guaranteed to be part of the global optimal. A first local optimal entry is a first cell at the intersection of the 'B' character in the top string and the first 'B' character in the second string (the B-B intersection). The B-B intersection dominates locally because 'A' characters are weighed as one, while 'B' characters are weighted as five. Thus, the first cell at the B-B intersection has a value of five, and an anticipated cost of its preceding cells is only four (i.e., the preceding top substring—AAAAAAAAB—has eight 'A' characters and one 'B' character, while the preceding left substring—AAAAB—has four 'A' characters and one 'B' character, for a total difference of four A's). As demonstrated by a first box comprising heavy lines in example 800b, there is a first partition defined by the top substring AAAAAAAAB and the left substring AAAAB, with the B-B intersection as an exit entry (i.e., on the bottom right of the box).

A second local optimal entry is a second cell at the intersection of the 'C' characters in both strings (the C-C intersection). The C-C intersection dominates locally because 'A' characters are weighed as one, while 'C' characters are weighted as ten. Thus, for example, the second cell at the C-C intersection has a value of ten, and an anticipated cost of its preceding entries (removing the first partition) is only seven (i.e., the preceding top substring—AAAAAAAAAAC—has ten 'A' characters and one 'C' character, while the preceding left substring—AAAC—has three 'A' characters and one 'C' character, for a total difference of seven A's). As demonstrated by a second box comprising heavy lines in example 800b, there is a second partition around the top substring BAAAAAAAAAAC and the left substring BAAAC, with the C-C intersection as an exit entry (i.e., on the bottom right of the box). Broken lines extending from the C-C intersection demonstrate an amount of the matrix actually solved by merely solving an optimal path through each of first and second partitions.

As demonstrated by a third box comprising heavy lines in example 800b defined by the top substring CA and the left substring CAAABAAAA, remaining is a third partition with the bottom-right cell as an exit entry (i.e., an A-A intersection on the bottom right of the box, representing the intersection of the full top string and the full left string). Broken lines extending from the A-A intersection demonstrate an amount of the matrix actually solved (i.e., the whole matrix) by merely solving an optimal path through each of the first, second, and third partitions.

Note that, in FIG. 8B, there is an overlap between the first box and the second box, and another overlap between the second box and the third box. These overlaps are present because the solution of one partition becomes the "empty string" starting point for the next partition. Thus, the solution of four for the B-B intersection that is the exit point for the first partition becomes the starting point for the second partition, and the solution of eleven for the C-C intersection that is the exit point for the second partition becomes the starting point for the third partition.

Notably, any solution that goes through the exit point of the first partition (i.e., the B-B intersection) is guaranteed to also go through the exit point of the second partition (i.e., the C-C intersection). Further, any solution that goes through the exit point of the second partition is guaranteed to also go through the exit point of the third partition (i.e., the A-A intersection on the bottom right of the box). Thus, optimal partial solutions are guaranteed to go through the entry and exit point of each partition, greatly simplifying the calculations needed to arrive calculate those partial solutions.

With these partitions identified (including their entries and exits), the debugging component 109 can solve each of these partitions individually (and potentially in parallel at different processing units), rather than solving the entire matrix. When utilizing the novel heuristic (described above) that makes a prediction of a minimum cost to be paid for each unique character type, the debugging component 109 reaches the edit distance calculation of twenty-two in only twenty-nine comparisons. In embodiments, this edit distance calculation is performed in $O(n*\log n)$ time at worst, and frequently in linear time $O(n)$.

Notably, in embodiments the partitioning just described in connection with FIG. 8B can be applied symmetrically. Conceptually, with respect to example 800b, this means that partitions can be identified by analyzing the matrix (or graph) from left-top to bottom-right, from bottom-right to left-top, or using combinations thereof. Thus, for any given intersection, the locally dominating cost analysis that attempts to identify partition(s) defined by that intersection can be done with respect to the substrings before the intersection (e.g., the substrings before the B-B and C-C intersections), and/or with respect to the substrings after the intersection (e.g., the substrings after the B-B and C-C intersections). Additionally, it is enough for one of the two sides of the intersection to meet the local optimal criteria for the symmetrical partition approach to apply.

To demonstrate, FIG. 8C illustrates an example 800c in which the substrings forming the second and third partitions from example 800b have been swapped, making the top string AAAAAAAABACAAAAAAAAAA and the bottom string AAAABAAABAAAACAAA. As shown, the diffing matrix corresponding to calculating an edit distance between these strings can be partitioned into a first partition around the B-B intersection defined by the top substring AAAAAAAAB and the left substring AAAAB with the B-B intersection as an exit entry (like in example 800b), a second partition around the C-C intersection defined by the top substring AC and the left substring AAABAAAAC with the C-C intersection as an entrance entry, and a third partition around the bottom-right A-A intersection defined by the top string AAAAAAAAAA and the bottom string AAA with the B-B intersection as an entrance entry and the C-C intersection as an exit entry. Notably, this partitioning works even though, with respect to the C-C intersection, the predicted cost of ten (i.e., a C weighted at ten) at the intersection does not locally dominate the predicted prior cost of eleven (i.e., six A's weighted one each, and one B weighted at five) from the substrings before the C-C intersection (i.e., AC and AAABAAAAC), because it does locally dominate the predicted future cost of seven (i.e., seven A's weighted at one each) from the substrings after the C-C intersection (i.e., CAAAAAAAAAA vs. CAAA). Thus, in example 800c, the first partition is identified based on a 30) cost of the B-B intersection dominating a cost of the substrings preceding the B-B intersection, the while third partition is identified based on a cost of the C-C intersection dominating a cost of the substrings after the C-C intersection; the second partition is what remains of the matrix after identifying the first and third partitions.

For all partitions that meet the criteria that they exit (or enter) at an intersection that locally dominates, there is a guarantee that any solution that goes through the entry (or exit) point of the partition is guaranteed to go through the exit (or entry) point of the same partition. With reference to example 800c, the first partition around AAAAAAAB and AAAAB meets these criteria, and since the empty string is part of the solution (by definition), then the B-B intersection is part of the global solution. Additionally, since the third partition around AAAAAAAAAA vs. AAA meets these criteria (from end to beginning) then the C-C intersection is also part of the global solution. This has now narrowed the search space from the B-B intersection to the C-C intersection, which means the second partition around AC and AAABAAAAC is the remaining partition and hence any solution to the global problem goes from entry at the B-B intersection to exit at the C-C intersection.

FIG. 1B illustrates additional detail of the debugging component 109, including sub-components (e.g., trace access component 114, entity identification component 115, entity weighting component 116, edit distance component 117, diffing structure generation component 118, path identification component 119, partitioning component 120, differencing component 121, output component 122, etc.) that operate to diff prior executions of an executable program. The depicted components of the debugging component 109 represent various functions that the debugging component 109 might implement or utilize in accordance with various embodiments described herein. It will be appreciated, however, that the depicted components—including their identity, sub-components, and arrangement—are presented merely as an aid in describing various embodiments of the debugging component 109 described herein, and that these components are non-limiting to how software and/or hardware might implement various embodiments of the debugging component 109 described herein, or of the particular functionality thereof.

The debugging component 109 is now described in connection with FIG. 9, which illustrates a method 900 for diffing prior executions of an executable program. Thus, the following discussion now refers to a method and method acts. Although the method acts may be discussed in certain orders, or may be illustrated in a flow chart as occurring in a particular order, no particular ordering is required unless specifically stated, or required because an act is dependent on another act being completed prior to the act being performed.

The trace access component 114 accesses plural execution traces of different execution contexts of an executable program, such as first and second execution traces (i.e., each being one of replayable execution traces 113) of prior executions of application 112, from the durable storage 104, from a remote computer system 202, etc. Turning to FIG. 9, method 900 comprises an act 901 of accessing execution traces, including an act 901a of accessing a first execution trace, and an act 901b of accessing a second execution trace. In some embodiments, act 901a comprises accessing a first execution trace that records execution of a first execution context. In some embodiments, act 901b comprises accessing a second execution trace that records execution of the entity. In an example of act 901, the trace access component 114 access the first execution trace and the second execution trace from the replayable execution traces 113. In embodiments, act 901 has a technical effect of loading replayable execution traces from durable storage 104, or from a remote computer system 202.

Returning to FIG. 1B, the entity identification component 115 identifies ordered sets of entities from the first execution trace and the second execution trace accessed in act 901. In various embodiments, these entities are function calls, kernel calls, telemetry datapoints, and the like, and thus the ordered sets are ordered sets of function calls, kernel calls, telemetry datapoints, and the like. Turning to FIG. 9, method

900 also comprises an act 902 of identifying ordered sets, including an act 902a of identifying a first ordered set comprising a first plurality of entities obtained from the first execution trace, and an act 902b of identifying a second ordered set comprising a first plurality of entities obtained from the second execution trace. In some embodiments, act 902a comprises identifying a first ordered set comprising a first plurality of entities obtained from a first trace of a first execution context of the executable program, while act 902b comprises identifying a second ordered set comprising a second plurality of entities obtained from a second trace of a second execution context of the executable program. In embodiments, act 902 has a technical effect of extracting concise comparison information (i.e., entities) from execution traces, and storing that comparison information in ordered sets for later diffing.

In some embodiments, the entity identification component 115 identifies function calls made by each execution context. Thus, in some embodiments, the first plurality of entities corresponds to a first plurality of function calls made by the first execution context, and the second plurality of entities corresponds to a second plurality of function calls made by the second execution context. In some embodiments, the entity identification component 115 groups multiple unique functions into a single entity type, such as by grouping a malloc( ) function and a calloc( ) function into a single entity type of memory allocation functions. Thus, in some embodiments, at least one entity type comprises different function calls from a common function call family.

In some embodiments, the entity identification component 115 ordered sets having differing numbers of entities (i.e., sets of different sizes). Thus, in some embodiments, a first number of entities in the first ordered set is different than a second number of entities in the second ordered set.

In some embodiments the entity identification component 115 converts each ordered set of entities into a corresponding string, with each character in the string representing an entity in a corresponding ordered set. Thus, as shown, some embodiments of method 900 also comprise an act 903 of converting ordered sets to strings, including an act 903a of converting the first ordered set into a character string, and an act 903b converting the second ordered set into a character string. In some embodiments, act 903a comprises converting the first ordered set of the first plurality of entities into a first string, each character in the first string representing a position and a type of a corresponding entity in the first ordered set, while act 903b comprises converting the second ordered set of the second plurality of entities into a second string, each character in the second string representing a position and a type of a corresponding entity in the second ordered set. In embodiments, act 903 has a technical effect of transforming trace data, such as a series of function calls, into a string that is readily usable for an edit distance calculation.

As shown, while act 901, act 902, and act 903 are performed with respect to each of the first execution trace (i.e., act 901a, act 902a, and act 903a) and the second execution trace (i.e., act 901b, act 902b, and act 903b), the there is no strict requirement of an ordering of these acts with respect to the first execution trace as they relate to the second execution trace. Thus, in various embodiments, these acts are performed serially (i.e., on one execution trace and then the other execution trace), or are performed at least partially in parallel (e.g., on both execution traces concurrently). Additionally, in various embodiments, act 902 is performed on an entire execution trace, or only on a subset thereof (e.g., all of the functions called by a given function invocation, all of the functions in a thread, etc.).

Returning to FIG. 1B, the entity weighting component 116 applies a weighting to each entity type identified by the entity identification component 115. Turning to FIG. 9, method 900 also comprises an act 904 of assigning a weighting to entity types. In some embodiments, act 904 comprises assigning a weighting to each entity type in the first plurality of entities and the second plurality of entities, including at least assigning a first weighting to a first entity type and assigning a second weighting to a second entity type, the first weighting being different than the second weighting. In embodiments, act 904 has a technical effect of enabling diffing based on entity weightings which, as demonstrated in connection with FIGS. 8A-8C, can significantly reduce a number of comparisons needed to compute an edit distance between two strings (or corresponding ordered sets).

In some embodiments, the entity weighting component 116 applies weightings to entity types based on their frequency within the identified ordered sets (e.g., entropy). Thus, in some embodiments, the first weighting is assigned to the first entity type, and the second weighting is assigned to the second entity type, based on a relative frequency of occurrence of each of the first entity type and the second entity type among the first ordered set and the second ordered set. In some embodiments, the entity weighting component 116 assigns less frequent entity types are assigned a higher weighting than more frequent entity types.

In some embodiments, when entities correspond to function calls, the entity weighting component 116 applies weightings to entity types based on an amount of work performed by the function call, or a computational cost of executing the function call. Thus, in some embodiments, the first entity type comprises a first function call and the second entity type comprises a second function call, and the first weighting is lower than the second weighting, based at least on the first function call executing fewer executable instructions than the second function call.

Returning to FIG. 1B, the edit distance component 117 calculates an edit distance between the ordered sets identified by the entity identification component 115. As shown, edit distance component 117 comprises a plurality of subcomponents, discussed infra, which it uses to calculate edit distance. Turning to FIG. 9, method 900 also comprises an act 905 of calculating an edit distance. In some embodiments, act 905 comprises calculating an edit distance between the first ordered set and the second ordered set. In embodiments act 905 has a technical effect of quantifying a difference between ordered sets, based on computing an edit distance between those ordered sets, and thus diffing corresponding execution traces.

In some embodiments, the edit distance component 117 calculates an edit distance between the ordered sets of entities directly, while in other embodiments, the edit distance component 117 calculates an edit distance between strings derived from those ordered sets. Thus, in some embodiments, calculating the edit distance between the first ordered set and the second ordered set comprises calculating an edit distance between the first string and the second string.

Returning to FIG. 1B, the edit distance component 117 comprises a diffing structure generation component 118. The diffing structure generation component 118 generates a diffing structure from the ordered sets identified by the entity identification component 115, such as the diffing matrix or the diffing graph introduced in connection with FIG. 4.

Figure 9:
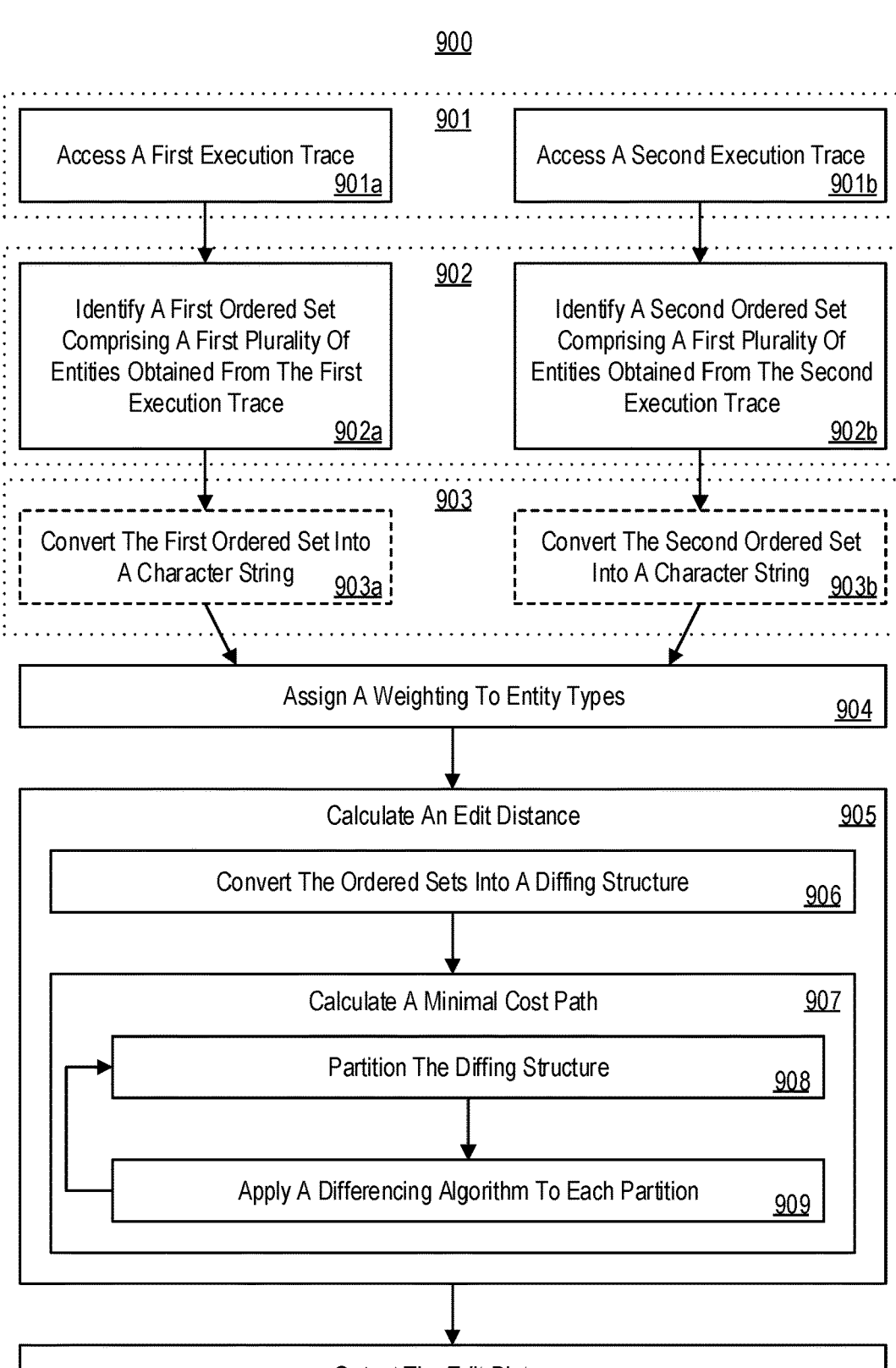
FIG. 9 illustrates a flow chart of an example method for diffing prior executions of an executable program.

Turning to FIG. 9, act 905 comprises an act 906 of converting the ordered sets into a diffing structure. In some embodiments, act 906 comprises creating a diffing matrix from the first ordered set and the second ordered set. In other embodiments, act 906 comprises creating a diffing graph from the first ordered set and the second ordered set.

Returning to FIG. 1B, the edit distance component 117 also comprises a path identification component 119. The path identification component 119 identifies a minimal cost path through the diffing structure generated by the diffing structure generation component 118, in order to compute a cost for an entry corresponding to a comparison between the full ordered sets—and, thus, an edit distance for the ordered sets. For example, in reference to FIG. 4, the edit distance component 117 computes a minimal cost path from node one to node sixteen in a diffing graph. Turning to FIG. 9, act 905 also comprises an act 907 of calculating a minimal cost path. In some embodiments, act 907 comprises calculating a minimal cost path through the diffing structure, the minimal cost path starting at a first entry representing an intersection between an empty first ordered set and an empty second ordered set, and ending at a second entry representing an intersection between an entire first ordered set and an entire second ordered set, the edit distance being based on a calculated cost at the second entry. In some embodiments, act 907 comprises calculating a minimal cost path through a diffing matrix, while in other embodiments act 907 comprises calculating a minimal cost path through a diffing graph.

In some embodiments, the path identification component 119 identifies a path from an entry representing an intersection of empty strings/ordered sets to an entry representing an intersection between full strings/ordered sets. Thus, in some embodiments, the first entry comprises an intersection of a first empty position of the first ordered set and a second empty position of the second ordered set, and the second entry comprises an intersection of a first ending position of the first ordered set and a second ending position of the second ordered set.

Returning to FIG. 1B, the path identification component 119 comprises a partitioning component 120. The partitioning component 120 relies on entity weights, and on the restriction of replacements to only identical entity types, in order to partition the diffing structure. For example, as discussed in connection with FIGS. 8B and 8C, embodiments use weightings to identify entries that correspond to a local optimal that is guaranteed to be part of the global optimal. This is accomplished by using varying entity weightings (identified by the entity weighting component 116) to identify entries representing replacements of identical characters across two strings, where that replacement has a cost that dominates in a local substring region; if the cost of that replacement is less than the cost of replacing a series of preceding lower-cost entities, then the diffing structure (generated by the diffing structure generation component 118) can be partitioned into a subsection that has that entry as a known exit point. Then, that subsection can be solved using an edit distance calculation algorithm (e.g., DP graph traversal algorithm, Dijkstra's algorithm, or A*), with that exit point as the destination.

Turning to FIG. 9, act 907 comprises an act 908 of partitioning the diffing structure. In some embodiments of act 908, calculating the minimal cost path includes identifying a partition of the diffing structure based on identifying an intersecting entry that is selected based on (i) only permitting replacements between entities in the first ordered set and the second ordered set that have a common entity type, and (ii) utilizing at least a difference between the first weighting and the second weighting to identify a single-entity replacement across the first ordered set and the second ordered set that has a higher replacement cost than an adjoining multi-entity replacement across the first ordered set and the second ordered set. In embodiments, act 908 has a technical effect of constraining the edit distance analysis to partitions that are relevant to local optimals, thereby significantly trimming a number of comparisons needed to arrive an edit distance calculation; for example, for a given 30) partition, act 908 very often only traverses the shortest path from the source (top left) to the destination (bottom right). In embodiments, act 908 also has a technical effect of enabling a parallelized edit distance calculation, by dividing the edit distance calculation into partitions that can be solved independently by the differencing component 121 at different processing units (or different computer systems).

As explained in connection with FIG. 8C, partitioning can be applied symmetrically, such that partitions can be identified by analyzing a matrix (or graph) from left-top to bottom-right, from bottom-right to left-top, or using combinations thereof. Thus, in embodiments of act 908, identifying the partition of the diffing structure based on identifying the intersecting entry comprises identifying the intersecting entry as having a predicted cost that dominates at least one of, (i) a first predicted cost calculated based on comparing a first subset of the first ordered set that precedes the intersecting entry and a first subset of the second ordered set that precedes the intersecting entry, or (ii) a second predicted cost calculated based on comparing a second subset of the first ordered set that is after the intersecting entry and a second subset of the second ordered set that is after the intersecting entry.

Returning to FIG. 1B, the path identification component 119 also comprises a differencing component 121. The differencing component 121 applies an edit distance calculation algorithm (e.g., DP graph traversal algorithm, Dijkstra's algorithm, or A*) on each partition identified by the partitioning component 120, to thereby compute partial solutions to the edit distance calculation. The differencing component 121 then combines these partial solutions to arrive at a total edit distance. Turning to FIG. 9, act 907 also comprises an act 909 of applying a differencing algorithm to each partition. In some embodiments of act 909, calculating the minimal cost path also includes applying a differencing algorithm to the partition, to identify a corresponding segment of the minimal cost path, the corresponding segment beginning ending with the intersecting entry.

As mentioned, in some embodiments, the differencing component 121 parallelizes the differencing calculations based on computing partial solutions from individual partitions at different processing units or computer systems. Thus, in some embodiments, calculating the minimal cost path comprises using a first processing unit to execute the differencing algorithm on a first identified partition to identify a first segment of the minimal cost path, and using a second processing unit to execute the differencing algorithm on a second identified partition to identify a second segment of the minimal cost path.

In some embodiments, the differencing algorithm is one of a DP graph traversal algorithm, a Dijkstra's algorithm, or an A* algorithm. In some embodiments, the differencing component 121 applies a novel constant-cost heuristic to the A* algorithm, introduced in connection with FIG. 8A, which is based on prohibiting replacements for non-matching characters, and which reduces the number of comparisons needed to arrive at an edit distance. Thus, in some embodiments, the differencing algorithm is the A path search algorithm, and the A* path search algorithm uses a future cost heuristic that predicts a remaining cost based on a restriction of only permitting replacements between entities in the first ordered set and the second ordered set that have a common entity type.

As shown by an arrow in act 907 in some embodiments, act 908 and act 909 repeat to identify and apply edit distance computations to one or more additional partitions. Thus, in embodiments, act 907 includes at least two iterations or instances of act 908 and act 909.

Returning to FIG. 1B, the output component 122 outputs the edit distance calculation to another software component at computer system 101, or to another computer system. In embodiments, the output component 122 also outputs a set of transformations (e.g., set of additions, deletions, and replacements to arrive at that edit distance). Turning to FIG. 9, method 900 also comprises an act 910 of outputting the edit distance. In some embodiments, act 910 comprises outputting the edit distance to a software component or to another computer system, and which causes the software component or to the other computer system to operate on the edit distance. In embodiment, act 910 also comprises outputting a set of transformations to arrive at that edit distance. In embodiments, act 910 has a technical effect of enabling identification of anomalous execution traces, and thus, likely sources of software bugs or faults. Thus, in some embodiments, the software component or the other computer system operating on the edit distance comprises at least one of (i) identifying one of the first trace of the first execution context or the second trace of the first execution context as being anomalous, or (ii) identifying a software fault in one of the first trace of the first execution context or the second trace of the first execution context.

Accordingly, the embodiments herein apply novel entity weighting, search space partitioning, and replacement restriction techniques in order to greatly reduce a number of computations that are needed in order to arrive at an edit distance for two given ordered sets, as compared to more traditional string/graph comparison techniques. As such, application of the novel entity weighting, search space partitioning, and replacement restriction techniques disclosed herein bring about a technical effect of greatly reducing usage of computing resources, including both processor cycles and memory usage, as compared to more traditional string/graph comparison techniques. As result, the embodiments herein enable a computer system to efficiently analyze the vast amounts of information captured by execution traces, in order to pinpoint prior executions during which undesired software behaviors/faults occurred.

Although described within the context of diffing execution traces, the embodiments described here are applicable to a variety of domains, and particularly domains in which it is desirable to diff sequences of unevenly distributed entities. In one example, each entity is a gene sequence, such that the first ordered set comprises a first ordered set of gene sequences, and the second ordered set comprises a second ordered set of gene sequences. In this example, entity types could include families based on genes function, such as genes coding for eye color, height, etc. In another example, each entity is a protein, such that the first ordered set comprises a first ordered set of proteins, and the second ordered set comprises a second ordered set of proteins. In this example, entity types could include families based on protein function, protein structure, protein composition, etc.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A method, implemented at a computer system that includes a processor, for diffing prior executions of an executable program, the method comprising:

identifying a first ordered set comprising a first plurality of entities obtained from a first trace of a first execution context of the executable program, and identifying a second ordered set comprising a second plurality of entities obtained from a second trace of a second execution context of the executable program;

assigning a weighting to each entity type in the first plurality of entities and the second plurality of entities, including at least assigning a first weighting to a first entity type and assigning a second weighting to a second entity type, the first weighting being different than the second weighting;

calculating an edit distance between the first ordered set and the second ordered set, including, creating a diffing structure from the first ordered set and the second ordered set; and calculating a minimal cost path through the diffing structure, the minimal cost path starting at a first entry representing an intersection between an empty first ordered set and an empty second ordered set, and ending at a second entry representing an intersection between an entire first ordered set and an entire second ordered set, the edit distance being based on a calculated cost at the second entry, calculating the minimal cost path including, for at least two iterations, (a) identifying a partition of the diffing structure based on identifying an intersecting entry in the diffing structure that corresponds to a local optimal, wherein, the intersecting entry is an entry or exit point of the partition and is selected based on (i) only permitting replacements between entities in the first ordered set and the second ordered set that have a common entity type, and (ii) utilizing at least a difference between the first weighting and the second weighting to identify a single-entity replacement across the first ordered set and the second ordered set that has a higher replacement cost than an adjoining multi-entity replacement across the first ordered set and the second ordered set; and the intersecting entry dominates at least one of (i) a first predicted cost calculated based on comparing a first subset of the first ordered set that precedes the intersecting entry and a first subset of the second ordered set that precedes the intersecting entry, or (ii) a second predicted cost calculated based on comparing a second subset of the first ordered set that is after the intersecting entry and a second subset of the second ordered set that is after the intersecting entry; and (b) applying a differencing algorithm to the partition, to identify a corresponding segment of the minimal cost path, the corresponding segment beginning or ending with the intersecting entry; and outputting the edit distance to a software component or to an other computer system, and which causes the software component or to the other computer system to operate on the edit distance.

2. The method of claim 1, wherein the first weighting is assigned to the first entity type, and the second weighting is assigned to the second entity type, based on a relative frequency of occurrence of each of the first entity type and the second entity type among the first ordered set and the second ordered set.

3. The method of claim 2, wherein less frequent entity types are assigned a higher weighting than more frequent entity types.

4. The method of claim 1, further comprising, converting the first ordered set of the first plurality of entities into a first string, each character in the first string representing a position and a type of a corresponding entity in the first ordered set; and converting the second ordered set of the second plurality of entities into a second string, each character in the second string representing a position and a type of a corresponding entity in the second ordered set.

5. The method of claim 4, wherein calculating the edit distance between the first ordered set and the second ordered set comprises calculating an edit distance between the first string and the second string.

6. The method of claim 1, wherein the first plurality of entities corresponds to a first plurality of function calls made by the first execution context, and wherein the second plurality of entities corresponds to a second plurality of function calls made by the second execution context.

7. The method of claim 6, wherein the first entity type comprises a first function call and the second entity type comprises a second function call, and wherein the first weighting is lower than the second weighting, based at least on the first function call executing fewer executable instructions than the second function call.

8. The method of claim 6, wherein at least one entity type comprises different function calls from a common function call family.

9. The method of claim 1, wherein calculating the minimal cost path through the diffing structure comprises, calculating a minimal cost path through one of a diffing matrix or a diffing graph.

10. The method of claim 1, wherein the first entry comprises an intersection of a first empty position of the first ordered set and a second empty position of the second ordered set, and wherein the second entry comprises an intersection of a first ending position of the first ordered set and a second ending position of the second ordered set.

11. The method of claim 1, wherein calculating the minimal cost path comprises, using a first processing unit to execute the differencing algorithm on a first identified partition to identify a first segment of the minimal cost path; and using a second processing unit to execute the differencing algorithm on a second identified partition to identify a second segment of the minimal cost path.

12. The method of claim 1, wherein the differencing algorithm is one of a dynamic programming graph traversal, a Dijkstra's algorithm, or an A* algorithm.

13. The method of claim 12, wherein the differencing algorithm is the A* algorithm, and wherein the A* algorithm uses a future cost heuristic that predicts a remaining cost based on a restriction of only permitting replacements between entities in the first ordered set and the second ordered set that have a common entity type.

14. The method of claim 1, wherein the software component or the other computer system operating on the edit distance comprises at least one of (i) identifying one of the first trace of the first execution context or the second trace of the first execution context as being anomalous, or (ii) identifying a software fault in one of the first trace of the first execution context or the second trace of the first execution context.

15. A computer system for diffing prior executions of an executable program, comprising:

a processor; and a computer storage medium that stores computer-executable instructions that are executable by the processor to at least:

identify a first ordered set comprising a first plurality of entities obtained from a first trace of a first execution context of the executable program, and identify a second ordered set comprising a second plurality of entities obtained from a second trace of a second execution context of the executable program;

assign a weighting to each entity type in the first plurality of entities and the second plurality of entities, including at least assigning a first weighting to a first entity type and assigning a second weighting to a second entity type, the first weighting being different than the second weighting;

calculate an edit distance between the first ordered set and the second ordered set, including, creating a diffing structure from the first ordered set and the second ordered set; and calculating a minimal cost path through the diffing structure, the minimal cost path starting at a first entry representing an intersection between an empty first ordered set and an empty second ordered set, and ending at a second entry representing an intersection between an entire first ordered set and an entire second ordered set, the edit distance being based on a calculated cost at the second entry, calculating the minimal cost path including, for at least two iterations, (a) identifying a partition of the diffing structure based on identifying an intersecting entry in the diffing structure that corresponds to a local optimal, wherein,

the intersecting entry is an entry or exit point of the partition and is selected based on (i) only permitting replacements between entities in the first ordered set and the second ordered set that have a common entity type, and (ii) utilizing at least a difference between the first weighting and the second weighting to identify a single-entity replacement across the first ordered set and the second ordered set that has a higher replacement cost than an adjoining multi-entity replacement across the first ordered set and the second ordered set; and the intersecting entry dominates at least one of (i) a first predicted cost calculated based on comparing a first subset of the first ordered set that precedes the intersecting entry and a first subset of the second ordered set that precedes the intersecting entry, or (ii) a second predicted cost calculated based on comparing a second subset of the first ordered set that is after the intersecting entry and a second subset of the second ordered set that is after the intersecting entry; and (b) applying a differencing algorithm to the partition, to identify a corresponding segment of the minimal cost path, the corresponding segment beginning or ending with the intersecting entry; and output the edit distance to a software component or to an other computer system, and which causes the software component or to the other computer system to operate on the edit distance.

16. The computer system of claim 15, wherein the first weighting is assigned to the first entity type, and the second weighting is assigned to the second entity type, based on a relative frequency of occurrence of each of the first entity type and the second entity type among the first ordered set and the second ordered set.

17. The computer system of claim 15, instructions also executable by the processor to at least:

convert the first ordered set of the first plurality of entities into a first string, each character in the first string representing a position and a type of a corresponding entity in the first ordered set; and convert the second ordered set of the second plurality of entities into a second string, each character in the second string representing a position and a type of a corresponding entity in the second ordered set.

18. The computer system of claim 15, wherein the first plurality of entities corresponds to a first plurality of function calls made by the first execution context, and wherein the second plurality of entities corresponds to a second plurality of function calls made by the second execution context.

19. A computer-readable hardware storage medium that stores computer-executable instructions that are executable by a processor system to at least:

identify a first ordered set comprising a first plurality of entities obtained from a first trace of a first execution context of an executable program, and identify a second ordered set comprising a second plurality of entities obtained from a second trace of a second execution context of the executable program;

assign a weighting to each entity type in the first plurality of entities and the second plurality of entities, including at least assigning a first weighting to a first entity type and assigning a second weighting to a second entity type, the first weighting being different than the second weighting;

calculate an edit distance between the first ordered set and the second ordered set, including, creating a diffing structure from the first ordered set and the second ordered set; and calculating a minimal cost path through the diffing structure, the minimal cost path starting at a first entry representing an intersection between an empty first ordered set and an empty second ordered set, and ending at a second entry representing an intersection between an entire first ordered set and an entire second ordered set, the edit distance being based on a calculated cost at the second entry, calculating the minimal cost path including, for at least two iterations, (a) identifying a partition of the diffing structure based on identifying an intersecting entry in the diffing structure that corresponds to a local optimal, wherein, the intersecting entry is an entry or exit point of the partition and is selected based on (i) only permitting replacements between entities in the first ordered set and the second ordered set that have a common entity type, and (ii) utilizing at least a difference between the first weighting and the second weighting to identify a single-entity replacement across the first ordered set and the second ordered set that has a higher replacement cost than an adjoining multi-entity replacement across the first ordered set and the second ordered set; and the intersecting entry dominates at least one of (i) a first predicted cost calculated based on comparing a first subset of the first ordered set that precedes the intersecting entry and a first subset of the second ordered set that precedes the intersecting entry, or (ii) a second predicted cost calculated based on comparing a second subset of the first ordered set that is after the intersecting entry and a second subset of the second ordered set that is after the intersecting entry; and (b) applying a differencing algorithm to the partition, to identify a corresponding segment of the minimal cost path, the corresponding segment beginning or ending with the intersecting entry; and output the edit distance to a software component or to an other computer system, and which causes the software component or to the other computer system to operate on the edit distance.

* * * * *